(12) United States Patent
Iwasaki

(10) Patent No.: US 9,832,358 B2
(45) Date of Patent: Nov. 28, 2017

(54) IMAGE-CAPTURING APPARATUS, IMAGE PROCESSING APPARATUS, METHOD FOR CONTROLLING IMAGE-CAPTURING APPARATUS, METHOD FOR CONTROLLING IMAGE PROCESSING APPARATUS, AND PROGRAM FOR THE SAME

(71) Applicant: CANON KABUSHIKI KAISHA, Tokyo (JP)

(72) Inventor: Takahiro Iwasaki, New York, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/894,259

(22) PCT Filed: May 29, 2014

(86) PCT No.: PCT/JP2014/002854
§ 371 (c)(1),
(2) Date: Nov. 25, 2015

(87) PCT Pub. No.: WO2014/192303
PCT Pub. Date: Dec. 4, 2014

(65) Prior Publication Data
US 2016/0119531 A1    Apr. 28, 2016

(30) Foreign Application Priority Data

May 31, 2013 (JP) .................................. 2013-115686

(51) Int. Cl.
*H04N 5/232* (2006.01)
*H04N 5/265* (2006.01)
*H04N 21/485* (2011.01)

(52) U.S. Cl.
CPC ..... *H04N 5/23206* (2013.01); *H04N 5/23293* (2013.01); *H04N 5/265* (2013.01); *H04N 21/4858* (2013.01)

(58) Field of Classification Search
CPC ........... H04N 5/23206; H04N 5/23293; H04N 5/265; H04N 5/772; H04N 21/4858; G06T 3/0031
(Continued)

(56) References Cited

U.S. PATENT DOCUMENTS 7,840,090 B2 * 11/2010 Asai .................. G06F 17/30056
   345/619
7,864,198 B2 * 1/2011 Moroto .................. G06T 11/60
   345/626

(Continued)

FOREIGN PATENT DOCUMENTS

JP    H03-74978 A    3/1991
JP    H07-131684 A   5/1995
(Continued)

*Primary Examiner* — Pritham Prabhakher
(74) *Attorney, Agent, or Firm* — Canon U.S.A., Inc. IP Division

(57) ABSTRACT

The related art has the problem of difficulty in providing the maximum number of actually superimposable images from an image-capturing apparatus to an external apparatus to which superimposition images are to be set, so that normal superimposition image setting cannot be performed from the external device.

An image-capturing apparatus includes a reception unit configured to receive a request to acquire information on setting of superimposition information; and a transmission unit configured, when the reception unit receives an acquisition request, to transmit a maximum number of superim-
(Continued)

position settings that the image-capturing apparatus can perform and a maximum number of settings for each kind of superimposition information.

17 Claims, 21 Drawing Sheets

(58) Field of Classification Search
USPC .................................................. 348/333.02
See application file for complete search history.

(56) References Cited

U.S. PATENT DOCUMENTS

| | | | | |
|---|---|---|---|---|
| 8,472,667 | B2* | 6/2013 | Suzuki | G06K 9/00771 |
| | | | | 348/169 |
| 8,937,676 | B2* | 1/2015 | Kogure | G06T 3/0031 |
| | | | | 348/333.02 |
| 9,532,008 | B2* | 12/2016 | Ohnishi | G03B 21/26 |
| 2003/0103139 | A1* | 6/2003 | Pretzer | G08B 13/19686 |
| | | | | 348/143 |
| 2003/0137589 | A1 | 7/2003 | Miyata | |
| 2008/0001852 | A1* | 1/2008 | Saiki | G09G 5/40 |
| | | | | 345/39 |
| 2008/0036877 | A1* | 2/2008 | Arima | H04N 7/18 |
| | | | | 348/231.8 |
| 2009/0310866 | A1 | 12/2009 | Hamasaki | |
| 2010/0166337 | A1* | 7/2010 | Murashita | H04N 5/262 |
| | | | | 382/284 |
| 2010/0182447 | A1* | 7/2010 | Namba | G02B 7/28 |
| | | | | 348/222.1 |
| 2012/0096126 | A1* | 4/2012 | Kamei | H04N 7/185 |
| | | | | 709/219 |
| 2012/0105702 | A1* | 5/2012 | Kogure | H04N 5/772 |
| | | | | 348/333.02 |
| 2012/0169893 | A1 | 7/2012 | Lee | |
| 2012/0281101 | A1* | 11/2012 | Fujinawa | H04N 1/00127 |
| | | | | 348/207.1 |
| 2012/0300259 | A1* | 11/2012 | Hosaka | G11B 27/034 |
| | | | | 358/1.15 |
| 2013/0016257 | A1* | 1/2013 | Sekiya | H04N 5/23293 |
| | | | | 348/240.99 |
| 2013/0100132 | A1* | 4/2013 | Katayama | H04N 13/0022 |
| | | | | 345/420 |

FOREIGN PATENT DOCUMENTS

| | | | |
|---|---|---|---|
| JP | H09-18781 | A | 1/1997 |
| JP | 2003-219406 | A | 7/2003 |
| JP | 2007-157047 | * | 6/2007 |
| JP | 2012-95195 | A | 5/2012 |
| RU | 2308082 | C2 | 10/2007 |
| RU | 2335017 | C2 | 9/2008 |

* cited by examiner

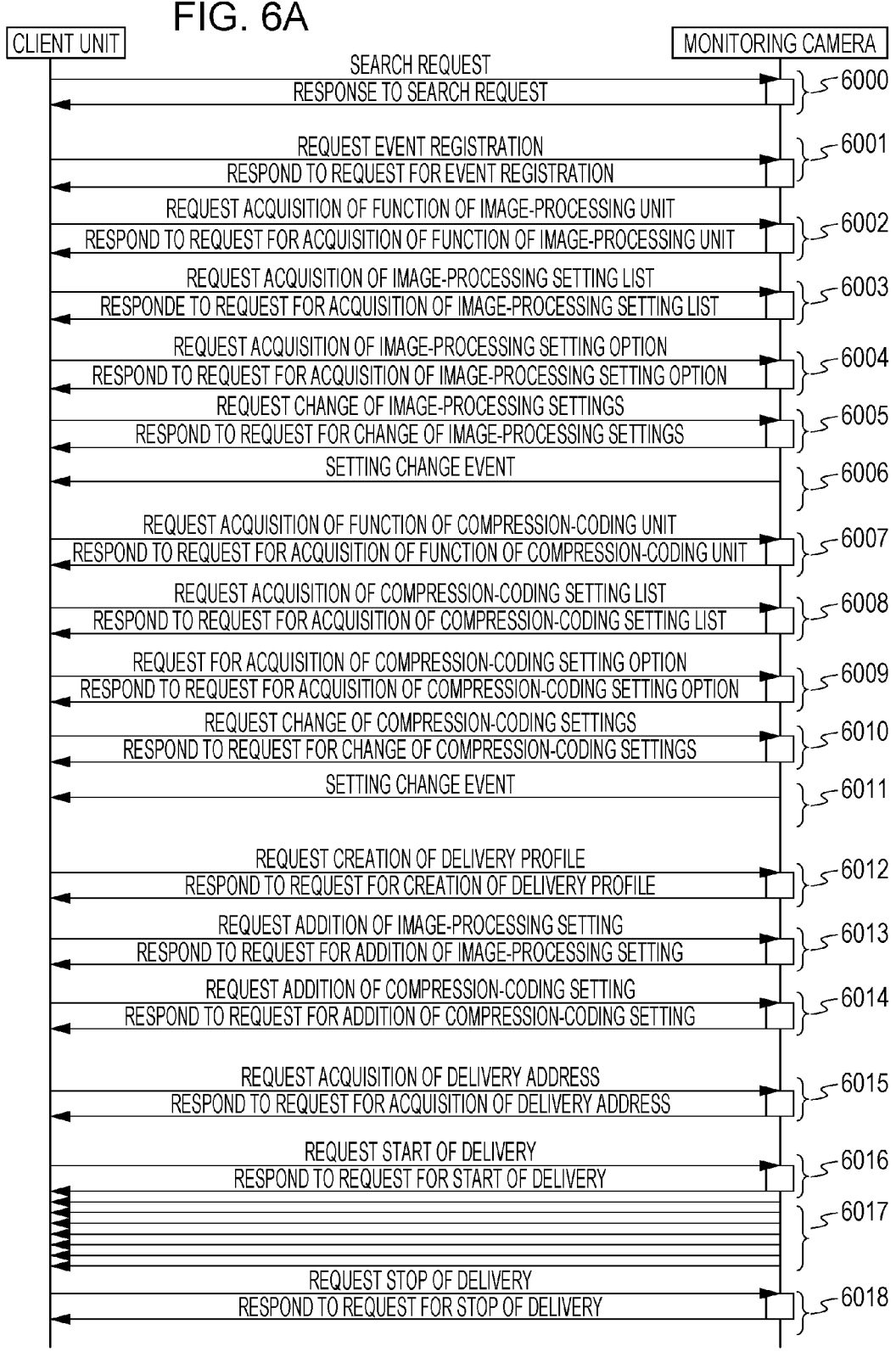

FIG. 7A
```
<IMAGE-SUPERIMPOSITION SETTING OPTION>
   <SUPERIMPOSED OBJECT>IMAGE</SUPERIMPOSED OBJECT>
   <SUPERIMPOSED OBJECT>TEXT</SUPERIMPOSED OBJECT>
   <SUPERIMPOSING POSITION>UPPER LEFT</SUPERIMPOSING POSITION>
   <SUPERIMPOSING POSITION>LOWER LEFT</SUPERIMPOSING POSITION>
   <SUPERIMPOSING POSITION>UPPER RIGHT</SUPERIMPOSING POSITION>
   <SUPERIMPOSING POSITION>LOWER RIGHT</SUPERIMPOSING POSITION>
   <MAXIMUM SETTING NUMBER>6</MAXIMUM SETTING NUMBER>
   <SUPERIMPOSITION TARGET>
      <ID TYPE=IMAGE-PROCESSING SETTING>A</ID>
      <MAXIMUM SETTING NUMBER>3</MAXIMUM SETTING NUMBER>
   </SUPERIMPOSITION TARGET>
   <SUPERIMPOSITION TARGET>
      <ID TYPE=IMAGE-PROCESSING SETTING>B</ID>
      <MAXIMUM SETTING NUMBER>3</MAXIMUM SETTING NUMBER>
   </SUPERIMPOSITION TARGET>
</IMAGE-SUPERIMPOSITION SETTING OPTION>
```

FIG. 7B
```
<IMAGE-SUPERIMPOSITION SETTING OPTION>
   <SUPERIMPOSED OBJECT>IMAGE</SUPERIMPOSED OBJECT>
   <SUPERIMPOSED OBJECT>TEXT</SUPERIMPOSED OBJECT>
   <SUPERIMPOSING POSITION>UPPER LEFT</SUPERIMPOSING POSITION>
   <SUPERIMPOSING POSITION>LOWER LEFT</SUPERIMPOSING POSITION>
   <SUPERIMPOSING POSITION>UPPER RIGHT</SUPERIMPOSING POSITION>
   <SUPERIMPOSING POSITION>LOWER RIGHT</SUPERIMPOSING POSITION>
   <MAXIMUM SETTING NUMBER>6</MAXIMUM SETTING NUMBER>
   <SUPERIMPOSITION TARGET>
      <ID TYPE=IMAGE-PROCESSING SETTING>A</ID>
      <MAXIMUM SETTING NUMBER>6</MAXIMUM SETTING NUMBER>
   </SUPERIMPOSITION TARGET>
   <SUPERIMPOSITION TARGET>
      <ID TYPE=IMAGE-PROCESSING SETTING>B</ID>
      <MAXIMUM SETTING NUMBER>6</MAXIMUM SETTING NUMBER>
   </SUPERIMPOSITION TARGET>
</IMAGE-SUPERIMPOSITION SETTING OPTION>
```

FIG. 7C
```
<IMAGE-SUPERIMPOSITION SETTING OPTION>
   <SUPERIMPOSED OBJECT>IMAGE</SUPERIMPOSED OBJECT>
   <SUPERIMPOSED OBJECT>TEXT</SUPERIMPOSED OBJECT>
   <SUPERIMPOSING POSITION>UPPER LEFT</SUPERIMPOSING POSITION>
   <SUPERIMPOSING POSITION>LOWER LEFT</SUPERIMPOSING POSITION>
   <SUPERIMPOSING POSITION>UPPER RIGHT</SUPERIMPOSING POSITION>
   <SUPERIMPOSING POSITION>LOWER RIGHT</SUPERIMPOSING POSITION>
   <MAXIMUM SETTING NUMBER>6</MAXIMUM SETTING NUMBER>
   <SUPERIMPOSITION TARGET>
      <ID TYPE=IMAGE-PROCESSING SETTING>A</ID>
      <MAXIMUM SETTING NUMBER>6</MAXIMUM SETTING NUMBER>
   </SUPERIMPOSITION TARGET>
</IMAGE-SUPERIMPOSITION SETTING OPTION>
```

FIG. 8

```
<IMAGE-SUPERIMPOSITION SETTING>    ⌒6150
  <ID>OSD1</ID>
  <SUPERIMPOSITION TARGET>
    <ID TYPE=IMAGE-PROCESSING SETTING>A</ID>
  </SUPERIMPOSITION TARGET>
  <SUPERIMPOSED OBJECT>TEXT</SUPERIMPOSED OBJECT>
  <SUPERIMPOSING POSITION>LOWER LEFT</SUPERIMPOSING POSITION>
  <SUPERIMPOSED TEXT>SCENE: ROAD</SUPERIMPOSED TEXT>
  <SUPERIMPOSED IMAGE></SUPERIMPOSED IMAGE>
</IMAGE-SUPERIMPOSITION SETTING>
<IMAGE-SUPERIMPOSITION SETTING>    ⌒6151
  <ID>OSD2</ID>
  <SUPERIMPOSITION TARGET>
    <ID TYPE=IMAGE-PROCESSING SETTING>A</ID>
  </SUPERIMPOSITION TARGET>
  <SUPERIMPOSED OBJECT>TEXT</SUPERIMPOSED OBJECT>
  <SUPERIMPOSING POSITION>LOWER RIGHT</SUPERIMPOSING POSITION>
  <SUPERIMPOSED TEXT>DATE: 03-01-2013</SUPERIMPOSED TEXT>
  <SUPERIMPOSED IMAGE></SUPERIMPOSED IMAGE>
</IMAGE-SUPERIMPOSITION SETTING>
<IMAGE-SUPERIMPOSITION SETTING>    ⌒6152
  <ID>OSD3</ID>
  <SUPERIMPOSITION TARGET>
    <ID TYPE=IMAGE-PROCESSING SETTING>B</ID>
  </SUPERIMPOSITION TARGET>
  <SUPERIMPOSED OBJECT>IMAGE</SUPERIMPOSED OBJECT>
  <SUPERIMPOSING POSITION>UPPER LEFT</SUPERIMPOSING POSITION>
  <SUPERIMPOSED TEXT></SUPERIMPOSED TEXT>
  <SUPERIMPOSED IMAGE>http://www.abcdef.co.jp/aaa/logo.jpg</SUPERIMPOSED IMAGE>
</IMAGE-SUPERIMPOSITION SETTING>
```

FIG. 12

```
<IMAGE-SUPERIMPOSITION SETTING OPTION>
  <SUPERIMPOSED OBJECT>IMAGE</SUPERIMPOSED OBJECT>
  <SUPERIMPOSED OBJECT>TEXT</SUPERIMPOSED OBJECT>
  <SUPERIMPOSING POSITION>UPPER LEFT</SUPERIMPOSING POSITION>
  <SUPERIMPOSING POSITION>LOWER LEFT</SUPERIMPOSING POSITION>
  <SUPERIMPOSING POSITION>UPPER RIGHT</SUPERIMPOSING POSITION>
  <SUPERIMPOSING POSITION>LOWER RIGHT</SUPERIMPOSING POSITION>
  <MAXIMUM SETTING NUMBER>6</MAXIMUM SETTING NUMBER>
  <SUPERIMPOSITION TARGET>
     <COMPRESSION CODING TYPE>H.264</COMPRESSION CODING TYPE>
     <MAXIMUM SETTING NUMBER>3</MAXIMUM SETTING NUMBER>
  </SUPERIMPOSITION TARGET>
  <SUPERIMPOSITION TARGET>
     <COMPRESSION CODING TYPE>JPEG</COMPRESSION CODING TYPE>
     <MAXIMUM SETTING NUMBER>3</MAXIMUM SETTING NUMBER>
  </SUPERIMPOSITION TARGET>
</IMAGE-SUPERIMPOSITION SETTING OPTION>
```

FIG. 13

```
<IMAGE-SUPERIMPOSITION SETTING>          6150
 <ID>OSD1</ID>
 <SUPERIMPOSITION TARGET>
    <COMPRESSION CODING TYPE>H.264</COMPRESSION CODING TYPE>
 </SUPERIMPOSITION TARGET>
 <SUPERIMPOSED OBJECT>TEXT</SUPERIMPOSED OBJECT>
 <SUPERIMPOSING POSITION>LOWER LEFT</SUPERIMPOSING POSITION>
 <SUPERIMPOSED TEXT>SCENE: ROAD</SUPERIMPOSED TEXT>
 <SUPERIMPOSED IMAGE></SUPERIMPOSED IMAGE>
</IMAGE-SUPERIMPOSITION SETTING>          6151
<IMAGE-SUPERIMPOSITION SETTING>
 <ID>OSD2</ID>
 <SUPERIMPOSITION TARGET>
    <COMPRESSION CODING TYPE>H.264</COMPRESSION CODING TYPE>
 </SUPERIMPOSITION TARGET>
 <SUPERIMPOSED OBJECT>TEXT</SUPERIMPOSED OBJECT>
 <SUPERIMPOSING POSITION>LOWER RIGHT</SUPERIMPOSING POSITION>
 <SUPERIMPOSED TEXT>DATE: 03-01-2013</SUPERIMPOSED TEXT>
 <SUPERIMPOSED IMAGE></SUPERIMPOSED IMAGE>
</IMAGE-SUPERIMPOSITION SETTING>          6152
<IMAGE-SUPERIMPOSITION SETTING>
 <ID>OSD3</ID>
 <SUPERIMPOSITION TARGET>
    <COMPRESSION CODING TYPE>JPEG</COMPRESSION CODING TYPE>
 </SUPERIMPOSITION TARGET>
 <SUPERIMPOSED OBJECT>IMAGE</SUPERIMPOSED OBJECT>
 <SUPERIMPOSING POSITION>UPPER LEFT</SUPERIMPOSING POSITION>
 <SUPERIMPOSED TEXT></SUPERIMPOSED TEXT>
 <SUPERIMPOSED IMAGE>http://www.abcdef.co.jp/aaa/logo.jpg</SUPERIMPOSED IMAGE>
</IMAGE-SUPERIMPOSITION SETTING>
```

FIG. 16

```
<IMAGE-SUPERIMPOSITION SETTING OPTION>
  <SUPERIMPOSED OBJECT>IMAGE</SUPERIMPOSED OBJECT>
  <SUPERIMPOSED OBJECT>TEXT</SUPERIMPOSED OBJECT>
  <SUPERIMPOSING POSITION>UPPER LEFT</SUPERIMPOSING POSITION>
  <SUPERIMPOSING POSITION>LOWER LEFT</SUPERIMPOSING POSITION>
  <SUPERIMPOSING POSITION>UPPER RIGHT</SUPERIMPOSING POSITION>
  <SUPERIMPOSING POSITION>LOWER RIGHT</SUPERIMPOSING POSITION>
  <MAXIMUM SETTING NUMBER>6</MAXIMUM SETTING NUMBER>
  <SUPERIMPOSITION TARGET>
    <ID TYPE=IMAGE-PROCESSING SETTING>A</ID>
    <COMPRESSION CODING TYPE>H.264</COMPRESSION CODING TYPE>
    <COMPRESSION CODING RESOLUTION><X>400</X><Y>240</Y></COMPRESSION CODING RESOLUTION>
    <MAXIMUM SETTING NUMBER>6</MAXIMUM SETTING NUMBER>
  </SUPERIMPOSITION TARGET>
  <SUPERIMPOSITION TARGET>
    <ID TYPE=IMAGE-PROCESSING SETTING>A</ID>
    <COMPRESSION CODING TYPE>H.264</COMPRESSION CODING TYPE>
    <COMPRESSION CODING RESOLUTION><X>1280</X><Y>720</Y><COMPRESSION CODING RESOLUTION>
    <MAXIMUM SETTING NUMBER>3</MAXIMUM SETTING NUMBER>
  </SUPERIMPOSITION TARGET>
                       – OMISSION –
  <SUPERIMPOSITION TARGET>
    <ID TYPE=IMAGE-PROCESSING SETTING>B</ID>
    <COMPRESSION CODING TYPE>JPEG</COMPRESSION CODING TYPE>
    <COMPRESSION CODING RESOLUTION><X>1280</X><Y>720</Y></COMPRESSION CODING RESOLUTION>
    <MAXIMUM SETTING NUMBER>3</MAXIMUM SETTING NUMBER>
  </SUPERIMPOSITION TARGET>
  <SUPERIMPOSITION TARGET>
    <ID TYPE=IMAGE-PROCESSING SETTING>B</ID>
    <COMPRESSION CODING TYPE>JPEG</COMPRESSION CODING TYPE>
    <COMPRESSION CODING RESOLUTION><X>1980</X><Y>1080</Y></COMPRESSION CODING RESOLUTION>
    <MAXIMUM SETTING NUMBER>3</MAXIMUM SETTING NUMBER>
  </SUPERIMPOSITION TARGET>
</IMAGE-SUPERIMPOSITION SETTING OPTION>
```

FIG. 17

```
<IMAGE-SUPERIMPOSITION SETTING>                    6150
 <ID>OSD1</ID>
 <SUPERIMPOSITION TARGET>
    <ID TYPE=IMAGE-PROCESSING SETTING>A</ID>
    <COMPRESSION CODING TYPE>H.264</COMPRESSION CODING TYPE>
    <COMPRESSION CODING RESOLUTION>1280×720</COMPRESSION CODING RESOLUTION>
 </SUPERIMPOSITION TARGET>
 <SUPERIMPOSED OBJECT>TEXT</SUPERIMPOSED OBJECT>
 <SUPERIMPOSING POSITION>LOWER LEFT</SUPERIMPOSING POSITION>
 <SUPERIMPOSED TEXT>SCENE: ROAD</SUPERIMPOSED TEXT>
 <SUPERIMPOSED IMAGE></SUPERIMPOSED IMAGE>
</IMAGE-SUPERIMPOSITION SETTING>                   6151
<IMAGE-SUPERIMPOSITION SETTING>
 <ID>OSD2</ID>
 <SUPERIMPOSITION TARGET>
    <ID TYPE=IMAGE-PROCESSING SETTING>A</ID>
    <COMPRESSION CODING TYPE>H.264</COMPRESSION CODING TYPE>
    <COMPRESSION CODING RESOLUTION>1280×720</COMPRESSION CODING RESOLUTION>
 </SUPERIMPOSITION TARGET>
 <SUPERIMPOSED OBJECT>TEXT</SUPERIMPOSED OBJECT>
 <SUPERIMPOSING POSITION>LOWER RIGHT</SUPERIMPOSING POSITION>
 <SUPERIMPOSED TEXT>DATE: 03-01-2013</SUPERIMPOSED TEXT>
 <SUPERIMPOSED IMAGE></SUPERIMPOSED IMAGE>
</IMAGE-SUPERIMPOSITION SETTING>                   6152
<IMAGE-SUPERIMPOSITION SETTING>
 <ID>OSD3</ID>
 <SUPERIMPOSITION TARGET>
    <ID TYPE=IMAGE-PROCESSING SETTING>B</ID>
    <COMPRESSION CODING TYPE>JPEG</COMPRESSION CODING TYPE>
    <COMPRESSION CODING RESOLUTION>400×240</COMPRESSION CODING RESOLUTION>
 </SUPERIMPOSITION TARGET>
 <SUPERIMPOSED OBJECT>IMAGE</SUPERIMPOSED OBJECT>
 <SUPERIMPOSING POSITION>UPPER LEFT</SUPERIMPOSING POSITION>
 <SUPERIMPOSED TEXT></SUPERIMPOSED TEXT>
 <SUPERIMPOSED IMAGE>http://www.abcdef.co.jp/aaa/logo.jpg</SUPERIMPOSED IMAGE>
</IMAGE-SUPERIMPOSITION SETTING>
```

ID 9,832,358 B2 omitted as header.

IMAGE-CAPTURING APPARATUS, IMAGE PROCESSING APPARATUS, METHOD FOR CONTROLLING IMAGE-CAPTURING APPARATUS, METHOD FOR CONTROLLING IMAGE PROCESSING APPARATUS, AND PROGRAM FOR THE SAME

TECHNICAL FIELD

The present invention relates to an image-capturing apparatus capable of transmitting a captured image to an external apparatus, and in particular, it relates to a technique for superimposing information, such as an image, on a captured image.

BACKGROUND ART

There is a known technique for superimposing an image or the like on a predetermined position of a captured image and transmitting the superimposed image. A known example is an on-screen display function (hereinafter, referred to as an OSD function) for displaying information, such as an image, at a fixed position of a captured image.

There is another known technique for dynamically changing a position of a captured image at which an image is to be superimposed. For example, PTL 1 discloses an image-capturing apparatus that moves the position of a cursor on a display screen in a panning or tilting direction in which the body of the apparatus moves.

However, increasing diversity of an image superimposing process sometimes causes a mismatch between the maximum number of superimposable images, which depends on individual superimposing processes, and the maximum number of images that can be set by the image-capturing apparatus as a whole.

Furthermore, there is no interface that provides the maximum number of images that can be superimposed by individual image superimposing processes to an external apparatus.

This poses the problem of difficulty in providing the maximum number of actually superimposable images from an image-capturing apparatus to an external apparatus to which superimposition images are to be set, so that normal superimposition image setting cannot be performed from the external device.

CITATION LIST

Patent Literature

PTL 1: Japanese Patent Laid-Open No. 7-131684

SUMMARY OF INVENTION

Solution to Problem

To solve the above problem, an image-capturing apparatus according to an aspect of the present invention includes a reception unit configured to receive a request to acquire information on setting of superimposition information; and a transmission unit configured, when the reception unit receives an acquisition request, to transmit a maximum number of superimposition settings that the image-capturing apparatus can perform and a maximum number of settings for each kind of superimposition information.

To solve the above problem, an image processing apparatus according to another aspect of the present invention includes a first acquisition unit configured to acquire the number of settings on superimposition information and the number of settings for each kind of superimposition information set in an image-capturing apparatus; a second acquisition unit configured to acquire a maximum number of superimposition settings that the image-capturing apparatus can perform and a maximum number of superimposition settings for each kind of superimposition information; and a display unit configured to display a screen for setting superimposition information in accordance with the result of comparison between information acquired by the first acquisition unit and information acquired by the second acquisition unit.

Further features of the present invention will become apparent from the following description of exemplary embodiments with reference to the attached drawings.

BRIEF DESCRIPTION OF DRAWINGS

FIG. 6A is a diagram showing a command sequence from the start of setting to delivery of an image according to an embodiment of the present invention.

FIG. 7A is a diagram showing an example of an image-superimposition setting option according to the first embodiment.

FIG. 7B is a diagram showing an example of an image-superimposition setting option according to the first embodiment.

FIG. 7C is a diagram showing an example of an image-superimposition setting option according to the first embodiment.

FIG. 8 is a diagram showing an example of the details of image-superimposition settings according to the first embodiment.

FIG. 12 is a diagram showing an example of an image-superimposition setting option according to the second embodiment.

FIG. 13 is a diagram showing an example of the details of image-superimposition settings according to the second embodiment.

FIG. 16 is a diagram showing an example of the details of an image-superimposition setting option according to the third embodiment.

FIG. 17 is a diagram showing an example of the details of image-superimposition settings according to the third embodiment.

DESCRIPTION OF EMBODIMENTS

Embodiments of the present invention will be described hereinbelow.

First Embodiment

Figure 1:
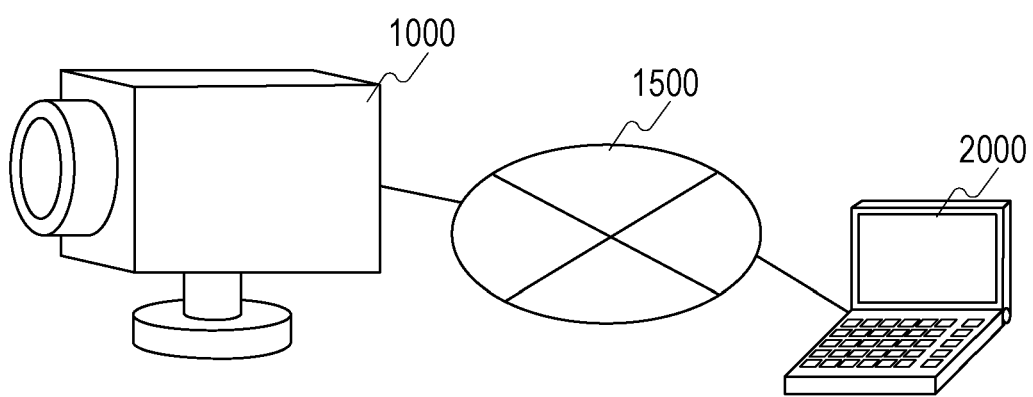
FIG. 1 is a configuration diagram of a monitoring camera system according to an embodiment of the present invention.

FIG. 1 is a configuration diagram of a monitoring camera system according to an embodiment of the present invention.

In FIG. 1, the monitoring camera system includes a monitoring camera 1000 according to an embodiment of the present invention and a client unit 2000, which is an external apparatus in the present invention. The monitoring camera 1000 and the client unit 2000 are connected so as to communicate with each other via an IP network 1500. The client unit 2000 transmits various commands for changing imaging parameters, driving a platform, starting video streaming, and so on, described later, to the monitoring camera 1000. The monitoring camera 1000 transmits responses to such commands and video streaming to the client unit 2000.

Figure 2:
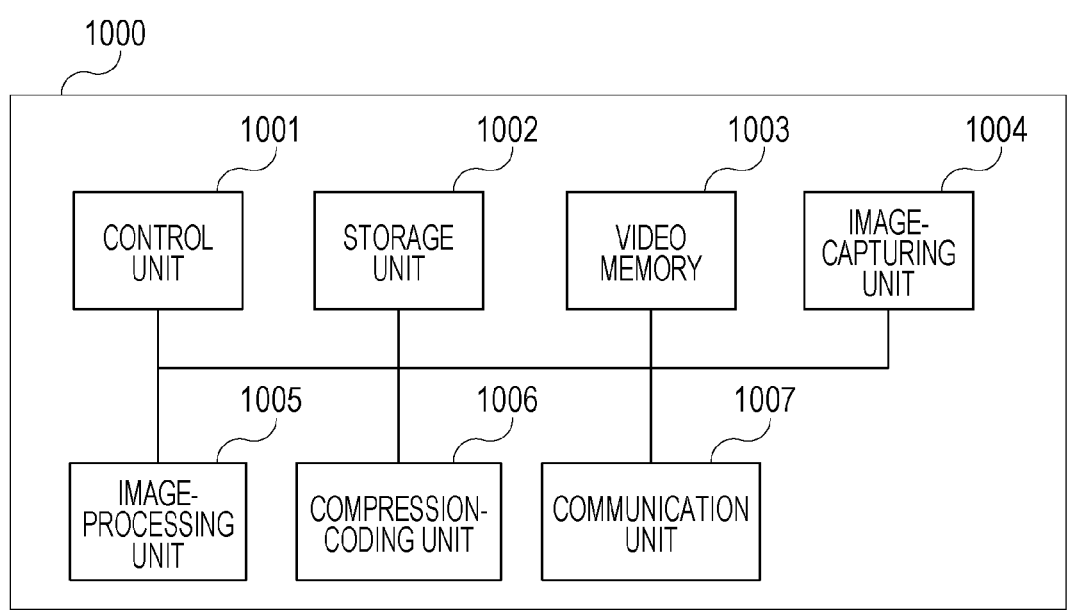
FIG. 2 is a diagram showing the internal configuration of a monitoring camera according to an embodiment of the present invention.

FIG. 2 is a diagram showing the internal configuration of the monitoring camera 1000.

In FIG. 2, a control unit 1001 controls the whole of the monitoring camera 1000. The control unit 1001 is a CPU, for example.

Reference sign 1002 denotes a storage unit. The storage unit 1002 is mainly used as a storage area for programs that the control unit 1001 executes and various set values and a work area during execution of the programs. Examples of the storage unit 1002 include a hard disk and a flash memory. The storage unit 1002 stores set values for an image-capturing-unit setting, a delivery profile, an image processing setting, a compression-coding setting, an image-superimposition setting, described later, and so on. The set values are referred to by the control unit 1001.

Reference sign 1003 denotes a video memory. The video memory 1003 includes a captured-image memory, a clipped-image memory, and a delivery-image memory depending on the purpose and is used as an image-data processing area for an image-capturing unit 1004, an image-processing unit 1005, and a compression-coding unit 1006, described later.

Reference sign 1004 denotes an image-capturing unit. The image-capturing unit 1004 converts an analog signal obtained by capturing a subject to digital data and outputs it as a captured image to a captured-image memory 1310, described later.

Reference sign 1005 denotes an image-processing unit. The image-processing unit 1005 clips a captured image that the image-capturing unit 1004 outputs to the captured-image memory 1310 on the basis of the details of an image processing setting, described later. The image-processing unit 1005 further performs an image superimposing process on the clipped image data on the basis of an image-superimposition setting, described later, and outputs it to the clipped-image memory. Since the monitoring camera 1000 of this embodiment has two image-capturing-unit settings, the monitoring camera 1000 includes two clipped-image memories 1321 and 1322.

Reference sign 1006 denotes a compression-coding unit. The compression-coding unit 1006 performs a resizing process on image data that the image-processing unit 1005 outputs to the clipped-image memory 1321 or 1322 on the basis of the details of a compression-coding setting, described later. The compression-coding unit 1006 further performs a compression coding process on the resized image data on the basis of a JPEG or H.264 format and outputs the compressed coded image data to delivery-image memories 13111 to 13223 as delivery images. If a request to start streaming is given from an external apparatus, the monitoring camera 1000 transmits the content of the delivery-image memory to the external apparatus by streaming on the basis of the details of the request.

Reference sign 1007 denotes a communication unit. The communication unit 1007 is used to receive control commands from the external client unit 2000 or to transmit responses to the control commands or a delivery image to the client unit 2000.

Although the internal configuration of the monitoring camera 1000 has been described with reference to FIG. 2, the processing blocks shown in FIG. 2 are merely examples of a monitoring camera of the present invention, and the present invention is not limited thereto. Various modifications and changes, such as addition of a sound input portion or an image-capture control portion for changing the orientation of the image-capturing unit, can be made within the spirit and scope of the present invention.

Next, the names and details of commands, parameters, and so on used in the first embodiment will be described hereinbelow.

Figure 3:
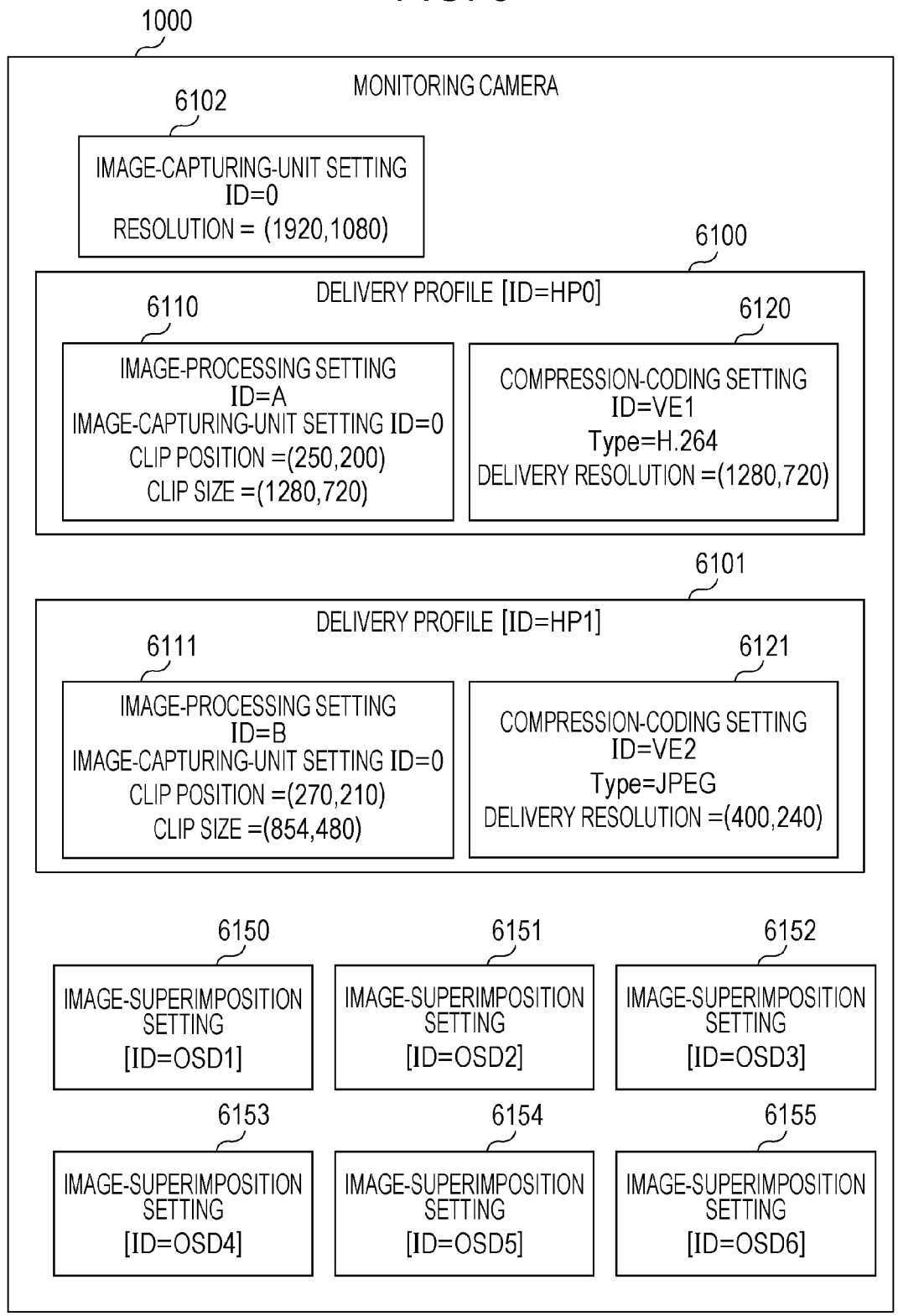
FIG. 3 is a diagram showing the structure of parameters that the monitoring camera according to an embodiment of the present invention holds.

FIG. 3 illustrates the structure of parameters that the monitoring camera 1000 of this embodiment holds. These parameters are stored in the storage unit 1002 in FIG. 2.

Reference signs 6100 and 6101 denote delivery profiles. The delivery profiles are parameter sets for storing various set items of the monitoring camera 1000 in association with each other. The delivery file 6100 holds the ID of the delivery profile 6100 and links to an image processing setting 6110 and a compression-coding setting 6120, described later, and so on.

Reference sign 6102 denotes an image-capturing-unit setting. The image-capturing-unit setting 6102 includes the ID of the image-capturing-unit setting 6102 and a resolution parameter of image data that the image-capturing unit 1004 can output.

Reference signs 6110 and 6111 denote image processing settings. The image processing settings 6110 and 6111 each include the parameters of the image-capturing-unit setting 6102 for outputting a captured image to be processed by the image-processing unit 1005 and parameters of a clip position and a clip size designating what part of the captured image is to be clipped and output to the clipped-image memory (1321 or 1322 in FIG. 4).

Reference signs 6120 and 6121 denote compression-coding settings. The compression-coding settings 6120 and 6121 are each a set of parameters for compression coding of image data that the image-processing unit 1005 outputs to the clipped-image memory 1321 or 1322. The compression-coding settings 6120 and 6121 each include the ID of the compression-coding setting, a compression-coding-type parameter indicating a compression coding type, and a delivery resolution indicating the resolution of an image output to the delivery-image memory after being compression coded.

Figure 4:
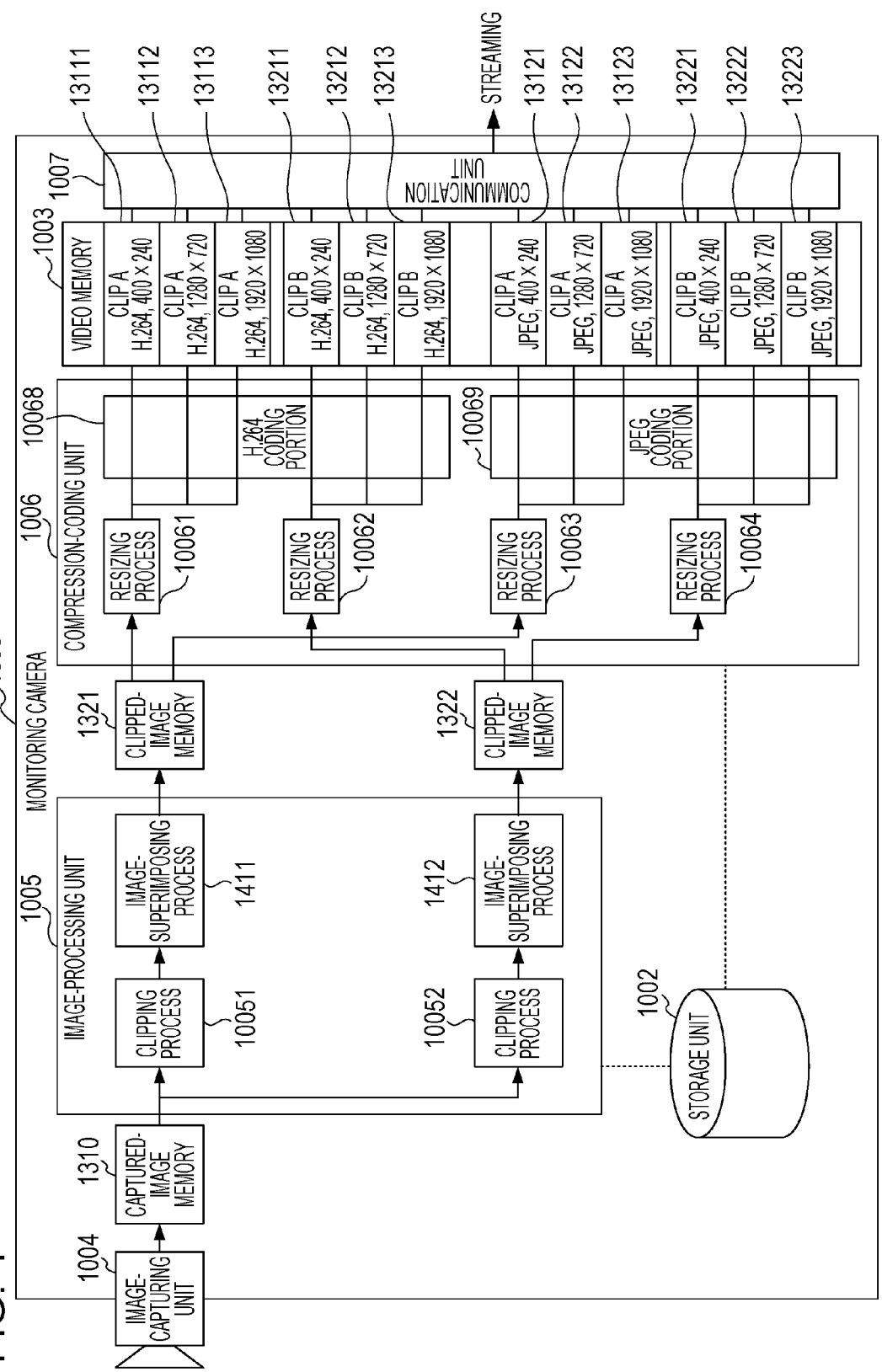
FIG. 4 is a diagram showing the relationship between the processing blocks and memories of the monitoring camera according to a first embodiment.

FIG. 4 is a diagram showing the relationship between the processing blocks and memories of the monitoring camera 1000 according to the first embodiment. The image-capturing unit 1004 outputs captured image data to the captured-image memory 1310.

Figure 5A:
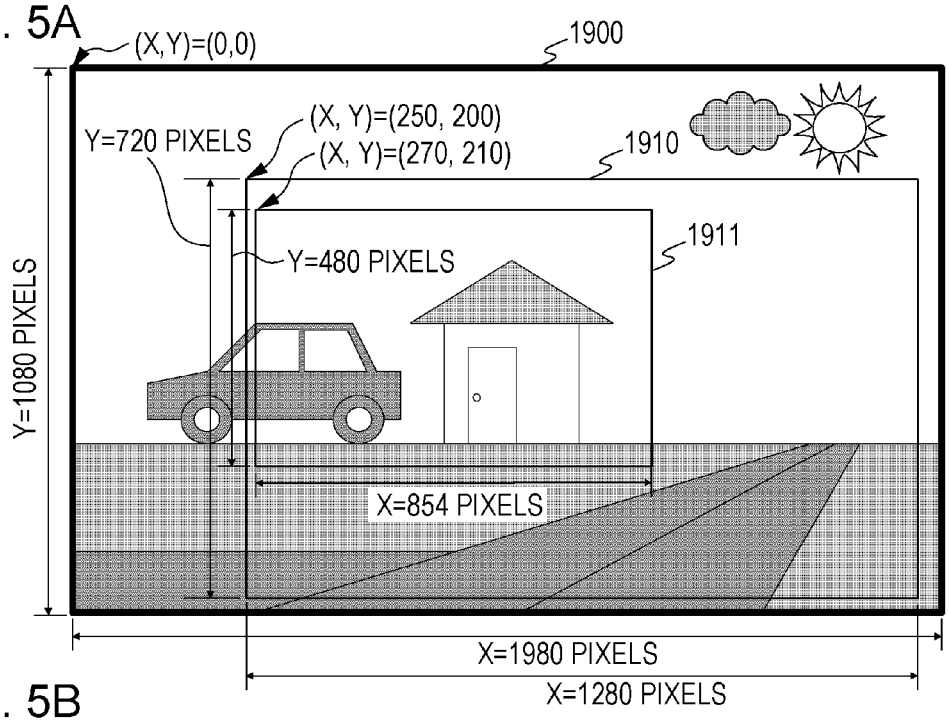
FIG. 5A is a diagram of an example of a captured image according to an embodiment of the present invention.

Reference sign 1900 in FIG. 5A denotes example image data that the image-capturing unit 1004 having the parameters shown in the image-capturing-unit setting 6102 stored in the storage unit 1002 outputs to the captured-image memory 1310.

The image-processing unit 1005 performs a clipping process on the image data 1900 output to the captured-image memory 1310 in accordance with an image processing setting read from the storage unit 1002 and outputs the clipped image to the clipped-image memory 1321 or 1322.

Reference signs 1910 and 1911 in FIG. 5A denote clipped images, which are obtained by processing the image data 1900 output to the captured-image memory 1310 with the image-processing unit 1005 in accordance with the image processing setting 6110 or 6111 in FIG. 3 and which are output to the clipped-image memory 1321 or 1322.

The image data 1910 is an image clipped at a clip position (250, 200) with the upper left of the image data 1900 as the origin (0, 0) in a clip size (1280, 720) by a clipping process 10051 in accordance with the image processing setting 6110.

The image data 1911 is an image clipped at a clip position (270, 210) of the image data 1900 in a clip size (854, 480) by a clipping process 10052 in accordance with the image processing setting 6111.

The image-processing unit 1005 further includes image superimposing processes 1411 and 1412. The image-processing unit 1005 reads an image-superimposition setting, described later, from the storage unit 1002 and determines whether an image-superimposition setting for the image processing setting 6110 or 6111 is present. If an image-superimposition setting for the image processing setting 6110 or 6111 is present, the image-processing unit 1005 superimposes an image on the clipped image 1910 or 1911 in accordance with the image-superimposition setting and outputs the clipped image to the clipped-image memory 1321 or 1322.

The compression-coding unit 1006 performs a resizing process and a compression coding process, represented by H.264, JPEG, on the clipped image output to the clipped-image memory in accordance with compression-coding setting stored in the storage unit 1002 and outputs the image to the video memory 1003.

The compression-coding unit 1006 resizes the images in the clipped-image memories 1321 and 1322 into three sizes in total, which can be designated by the compression-coding settings 6120 and 6121, in resizing processes 10061 to 10064. Furthermore, the resized images are compressed and coded in an H.264 coding portion 10068 or a JPEG coding portion 10069 and are output to the delivery-image memories 13111 to 13223 as delivery images.

The communication unit 1007 delivers delivery images in the delivery-image memories 13111 to 13223 in response to requests from the client unit 2000.

The communication unit 1007 reads the delivery profile 6100 or 6101 designated by the client unit 2000 from the storage unit 1002. The communication unit 1007 selects a target delivery-image memory in accordance with the details of an image processing setting and a compression-coding setting associated with the delivery profile 6100 or 6101 and delivers an image in the delivery-image memory by streaming to the client unit 2000.

Figure 5B:
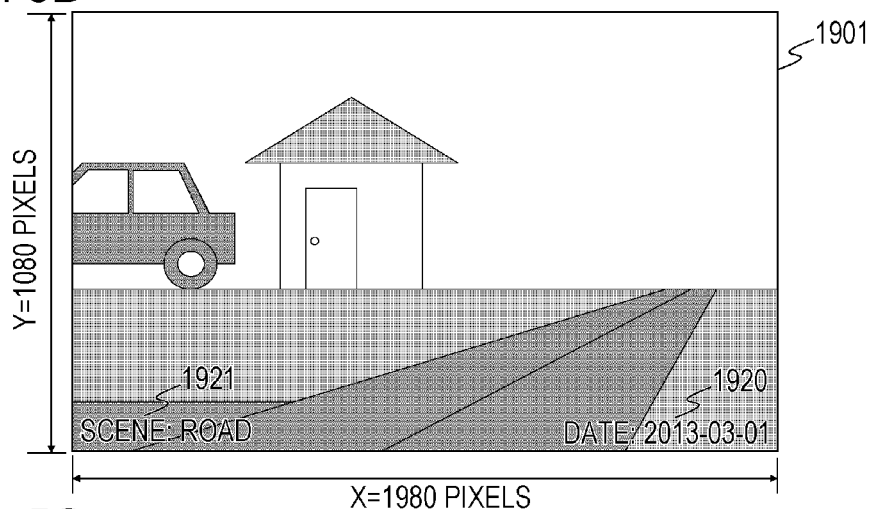
FIG. 5B is a diagram of a delivered image according to an embodiment of the present invention.

FIG. 5B illustrates an example image delivered to the client unit 2000 on the basis of the delivery profile 6100. This is an image clipped in accordance with the image processing setting 6110 and compressed and coded in the H.264 format into a size of 1,280×720 in accordance with the compression-coding setting 6120 and is stored in the delivery-image memory 13112.

In FIG. 5B, reference signs 1920 and 1921 denote superimposition images superimposed on the delivery image 1901 on the basis of the image-superimposition settings 6150 and 6151, respectively.

Next, the details of the image-superimposition settings 6150 and 6151 will be described with reference to FIG. 8.

Since the superimposition target in both settings 6150 and 6151 is image processing setting ID=A, that is, the image processing setting 6110 is designated, superimposition images 1920 and 1921 are superimposed on the delivery image 1901 clipped by the image processing setting 6110, shown in FIG. 5B.

Figure 5C:
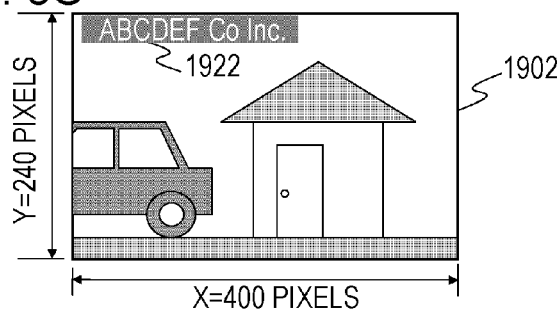
FIG. 5C is a diagram of a superimposition image according to an embodiment of the present invention.

In FIG. 5C, reference sign 1922 denotes a superimposition image superimposed on a delivery image 1902 on the basis of an image-superimposition setting 6152.

Next, the details of the image-superimposition setting 6152 will be described using FIG. 8.

Since the superimposition target is image processing setting ID=B, that is, the image processing setting 6111 is designated, the superimposition image 1922 is superimposed on the delivery image 1902 in FIG. 5C clipped by the image processing setting 6111.

FIG. 6A shows a typical command sequence from the start of setting to delivery of an image between the monitoring camera 1000 and the client unit 2000.

Here, a transaction refers to a pair of a command transmitted from the client unit 2000 to the monitoring camera 1000 and a response that the monitoring camera 1000 returns to the client unit 2000.

Reference sign 6000 denotes a transaction for device search. The client unit 2000 transmits a search request with predetermined conditions to the network. The monitoring camera 1000 that matches the conditions for search request returns a search response to the client unit 2000.

Reference sign 6001 denotes a transaction for requesting event registration. The client unit 2000 transmits an event registration request to the monitoring camera 1000 to request the monitoring camera 1000 to transmit an event if a trigger that satisfies the predetermined conditions is generated. The monitoring camera 1000 stores the details of the event registration in the storage unit 1002, and if a trigger that satisfies the predetermined conditions is generated, the monitoring camera 1000 transmits the event to the client unit 2000.

Reference sign 6002 denotes a transaction for acquiring the function of the image-processing unit 1005. This transaction causes the client unit 2000 to obtain information on the function of the image-processing unit 1005 of the monitoring camera 1000.

Reference sign 6003 denotes a transaction for acquiring an image processing setting list. This transaction causes the client unit 2000 to obtain a list including the IDs of image processing settings held in the storage unit 1002 from the monitoring camera 1000. In this embodiment, the image processing settings 6110 and 6111 are obtained.

Reference sign 6004 denotes a transaction for acquiring an image-processing setting option. This transaction causes the client unit 2000 to obtain settable choices and the range of set values for individual parameters of the image processing settings.

Reference sign 6005 denotes a transaction for changing image processing settings. This transaction causes the client unit 2000 to change the details of the image processing settings obtained by the transaction 6003 on the basis of the choices obtained by the transaction 6004. For example, the client unit 2000 changes the position and size of clipping. The monitoring camera 1000 stores the details of the changed image processing settings in the storage unit 1002.

Reference sign 6006 denotes a setting-change event. The monitoring camera 1000 determines whether there is a client unit in which an event to notify that the image processing settings are changed by the transaction 6005 is registered in advance, with reference to the storage unit 1002. If present, the monitoring camera 1000 transmits the event to the client unit.

Reference sign 6007 denotes a transaction for acquiring the function of the compression-coding unit 1006. This transaction causes the client unit 2000 to obtain information on the function of the compression-coding unit 1006 of the monitoring camera 1000.

Reference sign 6008 denotes a transaction for acquiring a compression-coding setting list. This transaction causes the client unit 2000 to obtain a list including the IDs of compression-coding settings stored in the storage unit 1002 from the monitoring camera 1000. In the first embodiment, the client unit 2000 acquires the compression-coding settings 6120 and 6121.

Reference sign 6009 denotes a transaction for acquiring a compression-coding setting option. This transaction causes the client unit 2000 to obtain settable choices and the range of set values for individual parameters of the compression-coding settings.

Reference sign 6010 denotes a transaction for changing compression-coding settings. This transaction causes the client unit 2000 to change the details of the compression-coding settings obtained by the transaction 6008 on the basis of the choices obtained by the transaction 6009. For example, the client unit 2000 changes the compression coding type or the clip size. The monitoring camera 1000 stores the details of the changed compression-coding settings in the storage unit 1002.

The transaction 6011 is a setting-change event. The monitoring camera 1000 determines whether there is a client unit in which an event to notify that the compression-coding settings are changed by the transaction 6010 is registered in advance, with reference to the storage unit 1002. If present, the monitoring camera 1000 transmits the event to the client unit 2000.

Reference sign 6012 denotes a transaction for requesting creation of a delivery profile. This transaction causes the client unit 2000 to newly create delivery profiles, as designated by 6100 and 6101, in the monitoring camera 1000 and to obtain the IDs of the created delivery profiles. The monitoring camera 1000 stores the newly created delivery profiles in the storage unit 1002.

Reference sign 6013 denotes a transaction for requesting addition of an image processing setting. This transaction causes the client unit 2000 to designate the IDs of the delivery profiles obtained by the transaction 6012 and the IDs of the image processing settings obtained by the transaction 6003. The monitoring camera 1000 associates the designated image processing settings with the designated delivery profiles and stores the details in the storage unit 1002.

Reference sign 6014 denotes a transaction for requesting addition of a compression-coding setting. This transaction causes the client unit 2000 to designate the IDs of the delivery profiles obtained by the transaction 6012 and the IDs of the compression-coding settings obtained by the transaction 6008 and to associate the compression-coding settings with the delivery profiles. The monitoring camera 1000 associates the designated compression-coding settings with the designated delivery profiles and stores the details in the storage unit 1002.

Reference sign 6015 denotes a transaction for requesting acquisition of a delivery address. In this transaction, the client unit 2000 designates one of the delivery profile IDs obtained by the transaction 6012 and obtains a delivery address for acquiring an images delivered on the basis of the settings of the designated delivery profile. The monitoring camera 1000 reads the designated profile ID from the storage unit 1002 and selects a delivery-image memory corresponding to the details of the associated image processing setting and compression-coding setting from the delivery-image memories 13111 to 13223. Furthermore, the monitoring camera 1000 returns a delivery address for delivering the image in the selected delivery-image memory to the client unit 2000.

Reference sign 6016 denotes a transaction for requesting start of delivery. In this transaction, the client unit 2000 designates the delivery address obtained by the transaction 6015 and starts image streaming based on the setting of the designated delivery profile. Specifically, the client unit 2000 starts image streaming based on the image processing setting and the compression-coding setting associated with the delivery profile designated by the transaction 6015. In this transaction 6016, the client unit 2000 receives the ID of streaming from the monitoring camera 1000. The monitoring camera 1000 stores association between streaming IDs and streaming in delivery in the storage unit 1002.

Reference sign 6017 denotes streaming delivered from the monitoring camera 1000 to the client unit 2000. Taking an example in which the delivery profile 6100 is designated in the request to acquire a delivery address in the transaction 6015 in FIG. 6A, an image delivered here is based on the image processing setting 6110 and the compression-coding setting 6120. In other words, an image processed in the clipping process 10051 and the resizing process 10061 and output to the delivery-image memory 13113 in FIG. 4 is delivered.

Reference sign 6018 denotes a transaction for stopping delivery. In this transaction, the client unit 2000 designates the ID of streaming obtained by the transaction 6016 and stops the streaming in delivery. The monitoring camera 1000 specifies streaming corresponding to the designated streaming ID with reference to the storage unit 1002 and stops the streaming.

Figure 6B:
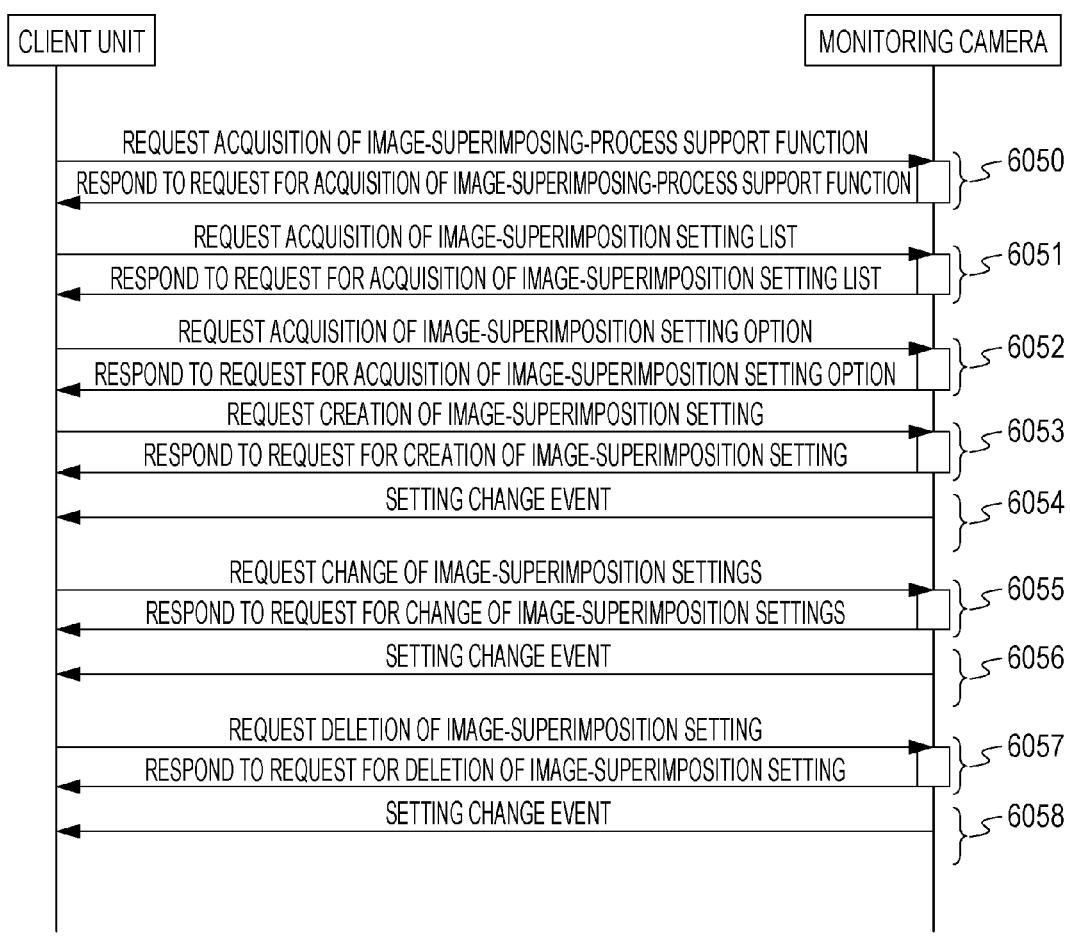
FIG. 6B is a diagram showing a command sequence of an image superimposing process according to an embodiment of the present invention.

FIG. 6B shows a typical command sequence of an image superimposing process between the monitoring camera 1000 and the client unit 2000.

Reference sign 6050 denotes a transaction for requesting acquisition of an image-superimposing-process support function. In this transaction, the client unit 2000 determines whether the monitoring camera 1000 supports the image superimposing process.

Reference sign 6051 denotes a transaction for requesting acquisition of an image-superimposition setting list. In this transaction, the client unit 2000 obtains a list including the IDs of image-superimposition settings that the monitoring camera 1000 stores in the storage unit 1002. In this embodiment, the client unit 2000 obtains image-superimposition settings 6150 to 6152 in FIG. 8. FIG. 8 shows an example of the details of the image-superimposition settings 6150 to 6152.

Reference sign 6052 denotes a transaction for acquiring an image-superimposition setting option. This transaction causes the client unit 2000 to obtain settable choices and the range of set values for individual parameters of the image-superimposition settings.

FIGS. 7A, 7B, and 7C show examples of the details of an image-superimposition setting option that the monitoring camera 1000 returns to the client unit 2000 by the transaction 6052.

FIG. 7A shows that the monitoring camera 1000 supports a maximum of six image-superimposition settings and that image processing settings A and B can be designated as the superimposition target, to each of which a maximum of three image-superimposition settings can be applied. In other words, if the seventh image-superimposition setting is to be created irrespective of the superimposition target, the monitoring camera 1000 returns an error response indicating that the setting cannot be created.

If the fourth image-superimposition setting for the image processing setting A is designated by the client unit 2000, the monitoring camera 1000 returns an error response indicating that the designation is impossible even if the sum of image-superimposition settings is six or less.

FIG. 7B shows that the monitoring camera 1000 supports a maximum of six image-superimposition settings and that the image processing settings A and B can be designated as the superimposition target, to each of which a maximum of six image-superimposition settings can be applied. If the fourth image-superimposition setting for the image processing setting A is designated from the client unit 2000, the monitoring camera 1000 returns a normal response indicating that the setting can be designated if the sum of image-superimposition settings is six or less.

FIG. 7C shows that the monitoring camera 1000 supports a maximum of six image-superimposition settings and that only the image processing setting A can be designated as the superimposition target, to which a maximum of six image-superimposition settings can be applied. In this case, the image processing setting B is not supported. If an image-superimposition setting for the image processing setting B is designated from the client unit 2000, the monitoring camera 1000 returns an error response indicating that the designation is impossible even if the sum of image-superimposition settings is six or less.

Reference sign 6053 in FIG. 6B denotes a transaction for creating image-superimposition setting. This transaction 6053 causes the client unit 2000 to create a new image-superimposition setting in the monitoring camera 1000 on the basis of the choices obtained by the transaction 6052.

Reference signs 6054, 6056, and 6058 in FIG. 6B denote setting-change events.

The monitoring camera 1000 transmits the event of notifying that an image-superimposition setting is newly created, changed, or deleted by the transaction 6054 or 6055, described later, to the client unit 2000 in which the event is registered.

Reference sign 6055 denotes a transaction for changing image-superimposition settings. This transaction 6055 causes the client unit 2000 to change the details of the image-superimposition settings obtained by the transaction 6051 and the details of the new image-superimposition setting created by the transaction 6053 on the basis of the choices obtained by the transaction 6052. For example, the client unit 2000 changes the position of superimposition and the details of superimposition text.

Reference sign 6057 denotes a transaction for deleting an image-superimposition setting. This transaction 6056 causes the client unit 2000 to delete the image-superimposition settings obtained by the transaction 6051 or the image-superimposition setting newly created by the transaction 6053 from the monitoring camera 1000. The monitoring camera 1000 deletes an image-superimposition setting having a designated ID from the storage unit 1002.

Figure 9:
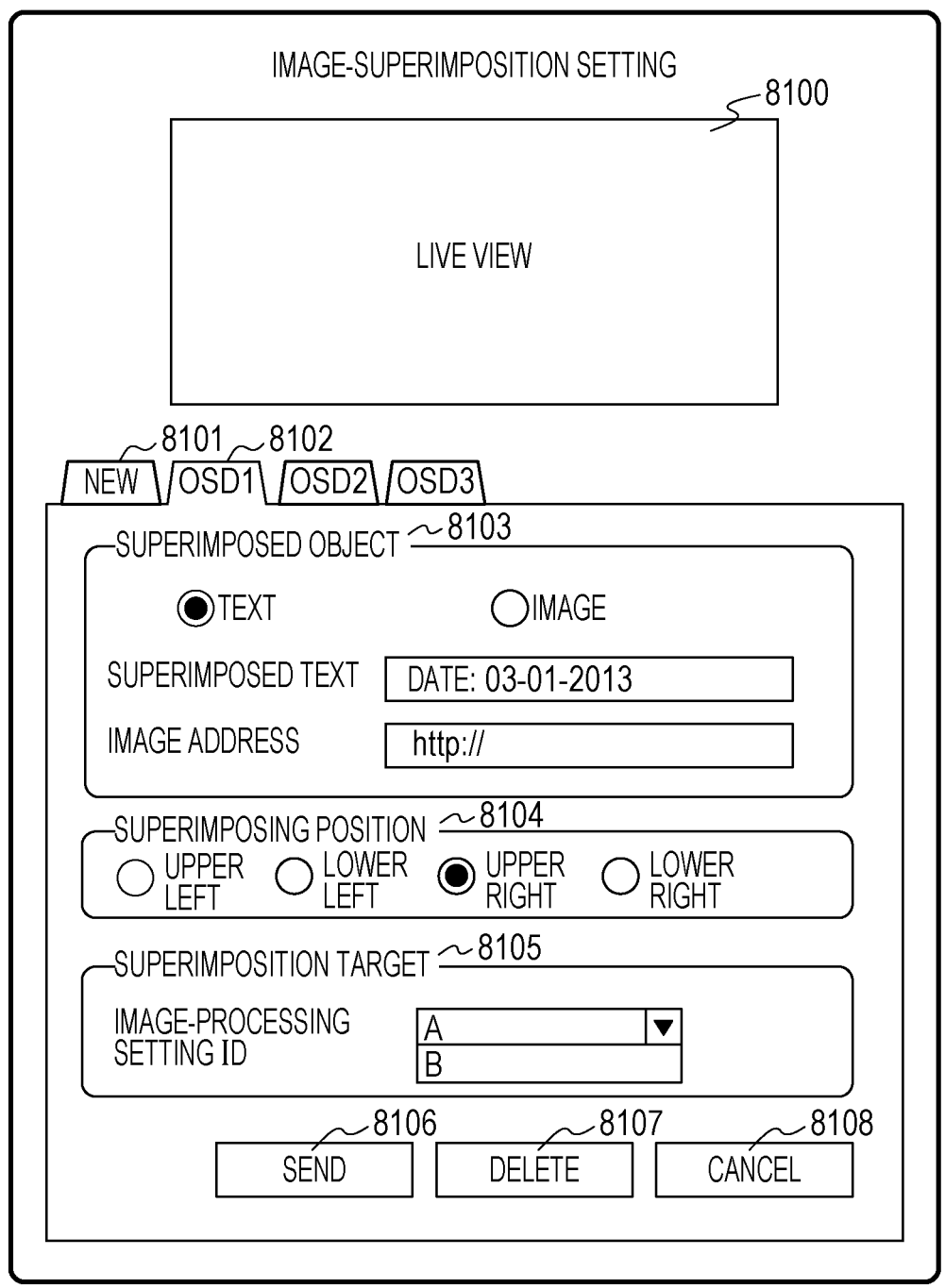
FIG. 9 is a diagram showing an example of an image-superimposition setting screen for setting image superimposition according to the first embodiment.

FIG. 9 shows an example of an image-superimposition setting screen of the client unit 2000 for setting image superimposition of the monitoring camera 1000.

Reference sign 8100 denotes a live view area. When this setting screen of the client unit 2000 is opened, the client unit 2000 executes the transactions 6015 to 6017 in FIG. 6A to display a sample image that the monitoring camera 1000 is delivering at the present. Furthermore, the client unit 2000 executes the transaction 6052 for requesting acquisition of an image-superimposition setting option to create the details of the image-superimposition setting screen described below.

Reference sign 8101 denotes an image-superimposition setting tab. If the number of image-superimposition settings obtained by the transaction 6051 is less than the maximum setting number in the image-superimposition setting option obtained by the transaction 6052, the client unit 2000 displays the image-superimposition setting tab 8101 to provide a screen for creating a new image-superimposition setting. The details of the screen are the same as an image-superimposition setting tab described below.

Reference sign 8102 denotes an image-superimposition setting tab. The client unit 2000 displays image-superimposition setting tabs corresponding to the number of image-superimposition settings obtained by the transaction 6051. The screen displayed in the OSD1 tab 8102 in FIG. 9 is a screen for changing the details of the image-superimposition setting 6150 in FIG. 3.

Reference sign 8103 denotes a superimposed-object specification area. The client unit 2000 provides choices of a superimposed image depending on the kind of a superimposed-image parameter in the image-superimposition setting option obtained by the transaction 6052. If text can be selected, the client unit 2000 displays a superimposed-text box for inputting superimposed text, and if an image can be selected, the client unit 2000 displays an image-address box for inputting the address of a target image.

Reference sign 8104 denotes a superimposing-position specification area. The client unit 2000 provides choices of superimposing position in a delivery image depending on the details of a superimposing-position parameter in the image-superimposition setting option obtained by the transaction 6052.

Reference sign 8105 denotes a superimposed-object specification area. The client unit 2000 provides choices of the superimposition target depending on the details of a superimposition-target parameter in the image-superimposition setting option obtained by the transaction 6052. In FIG. 9, the targets of superimposition and image processing settings A and B shown in FIG. 7A are provided as choices.

When displaying the choices in the superimposed-object specification area 8105, the client unit 2000 compares the image-superimposition settings set in the monitoring camera 1000 at present, obtained by the transaction 6051, and the maximum setting number of the superimposition-target parameters in the image-superimposition setting option obtained by the transaction 6052. For example, if the maximum setting number for the image processing setting A is 3, as shown in FIG. 7A, the client unit 2000 displays image processing setting ID=A as a choice in the superimposed-object specification area 8105 only when the number of image-superimposition settings for the image processing setting A held in the monitoring camera 1000 is 3 or less.

Similarly, as shown in FIG. 7C, if the image processing setting B is not displayed as the superimposition target, the client unit 2000 does not display the image processing setting ID=B as a choice in the superimposed-object specification area 8105.

Reference sign 8106 denotes a send button. When the send button 8106 in the image-superimposition setting tab 8101 is pressed, the client unit 2000 transmits the details of the setting values in the areas 8103 to 8105 to the monitoring camera 1000 as an image-superimposition-setting creation request. If the send button 8106 in the image-superimposition setting tab 8102 is pressed, the client unit 2000 transmits the details of the setting values in the areas 8103 to 8105 to the monitoring camera 1000 as an image-superimposition-setting change request for the image-superimposition setting of the ID shown in the tab 8102.

Reference sign 8107 denotes a delete button. When the delete button 8107 on the screen of the image-superimposition setting tab 8102 is pressed, the client unit 2000 transmits an image-superimposition-setting deletion request for the image-superimposition setting of the ID shown in the tab 8102 to the monitoring camera 1000. The delete button 8107 is not necessary and is not displayed on the screen of the new image-superimposition setting tab 8101.

Reference sign 8108 denotes a cancel button. When the cancel button 8108 is pressed, the client unit 2000 exits the image-superimposition setting screen.

Referring to the flowcharts in FIGS. 10A, 10B, and 10C, workflows for image-superimposition setting in the monitoring camera 1000 and the client unit 2000 will be described.

Figure 10A:
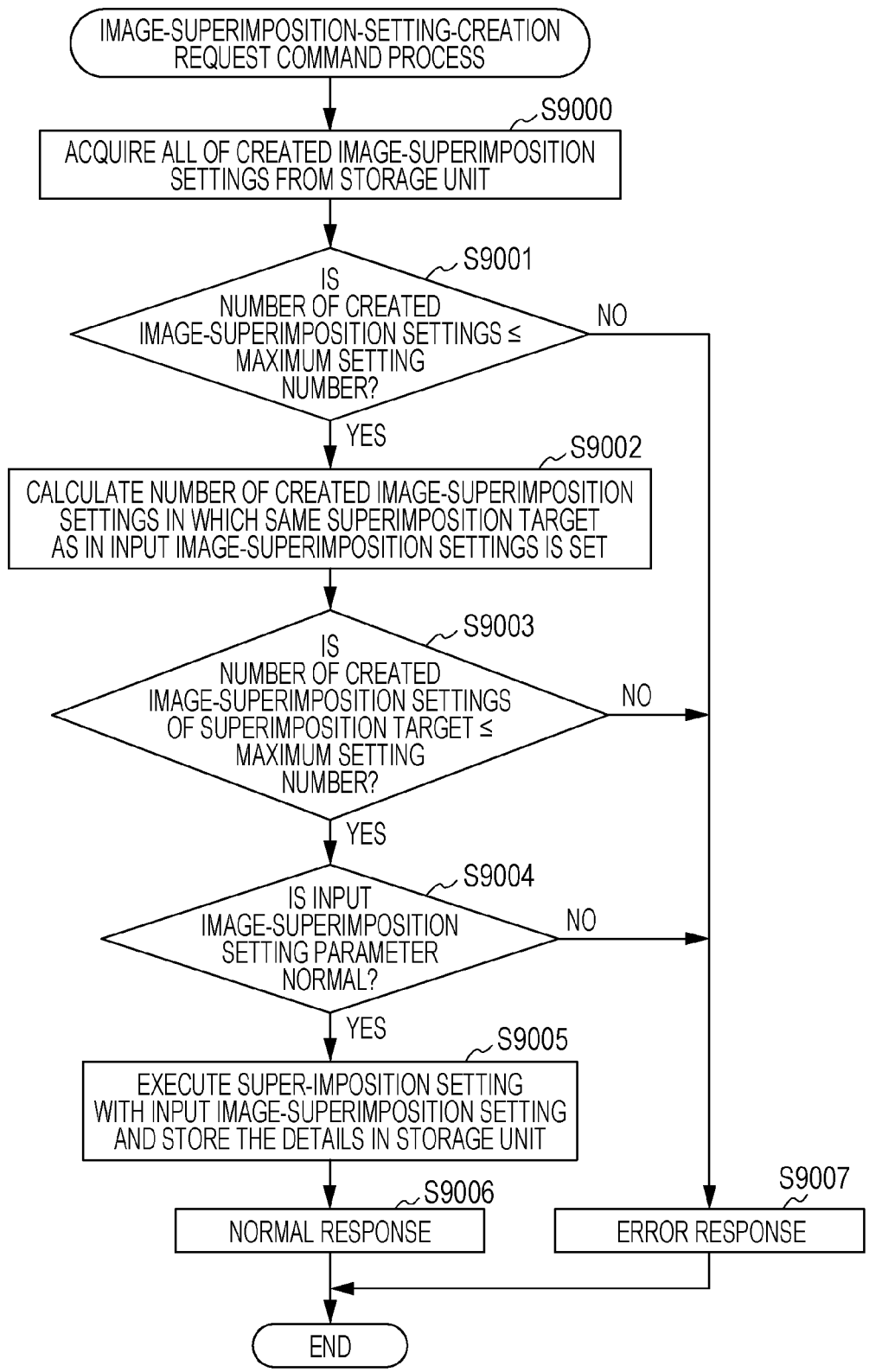
FIG. 10A is a flowchart for setting image superimposition in the monitoring camera.

FIG. 10A is a flowchart for an image-superimposition-setting-creation request command process in the monitoring camera 1000. The control unit 1001 of the monitoring camera 1000 executes this process when receiving an image-superimposition-setting creation request command.

In step S9000, the control unit 1001 acquires all of created image-superimposition settings from the storage unit 1002.

In step S9001, the control unit 1001 compares the number of the created image-superimposition settings acquired in step S9000 with the maximum number of image-superimposition settings that the monitoring camera 1000 can hold. Specifically, the control unit 1001 compares the number of created image-superimposition settings (the total number of image-superimposition settings) acquired in step S9000 with the maximum setting number in the image-superimposition setting option described with reference to FIGS. 7A, 7B, and 7C.

If the number of created image-superimposition settings is equal to or less than the maximum setting number, the control unit 1001 goes to step S9002, and if not, goes to step S9007.

In step S9002, the control unit 1001 calculates, among the created image-superimposition settings acquired in step S9000, the number of image-superimposition settings in which the same superimposition target as that included in the image-superimposition setting input in the image-superimposition-setting-creation request command is set.

In step S9003, the control unit 1001 determines whether the number of the image-superimposition settings calculated in step S9002 is equal to or less than the maximum setting number for the superimposition target. Specifically, the control unit 1001 compares the number of the created image-superimposition settings acquired in step S9002 with the maximum setting number for each image processing setting in the image-superimposition setting option, described with reference to FIGS. 7A, 7B, and 7C.

If it is equal to or less than the maximum setting number for the superimposition target, the control unit 1001 determines that the input image-superimposition setting can be created and goes to step S9004. If it exceeds the maximum setting number for the superimposition target, the control unit 1001 determines that the input image-superimposition setting cannot be created and goes to step S9007.

In step S9004, the control unit 1001 determines whether the parameter of the input image-superimposition setting is normal. Specifically, the control unit 1001 determines whether the parameter of the input image-superimposition setting is within the range of the parameter that can be designated for the image-superimposition setting provided to the client unit 2000 by the transaction 6052. If the parameter is normal, the control unit 1001 goes to step S9005. If the parameter is not normal, the control unit 1001 determines that the input image-superimposition setting cannot be created and goes to step S9007.

In step S9005, the control unit 1001 executes an image superimposing process with the input image-superimposition setting so that the details of the input image-superimposition setting is reflected to an image delivered by the monitoring camera 1000. Furthermore, the control unit 1001 stores the details of the input image-superimposition setting in the storage unit 1002 as a created image-superimposition setting.

In step S9006, the control unit 1001 transmits a normal response via the communication unit 1007 and exits the image-superimposition-setting-creation request command process.

In step S9007, the control unit 1001 transmits an error response via the communication unit 1007 and exits the image-superimposition-setting-creation request command process.

Figure 10B:
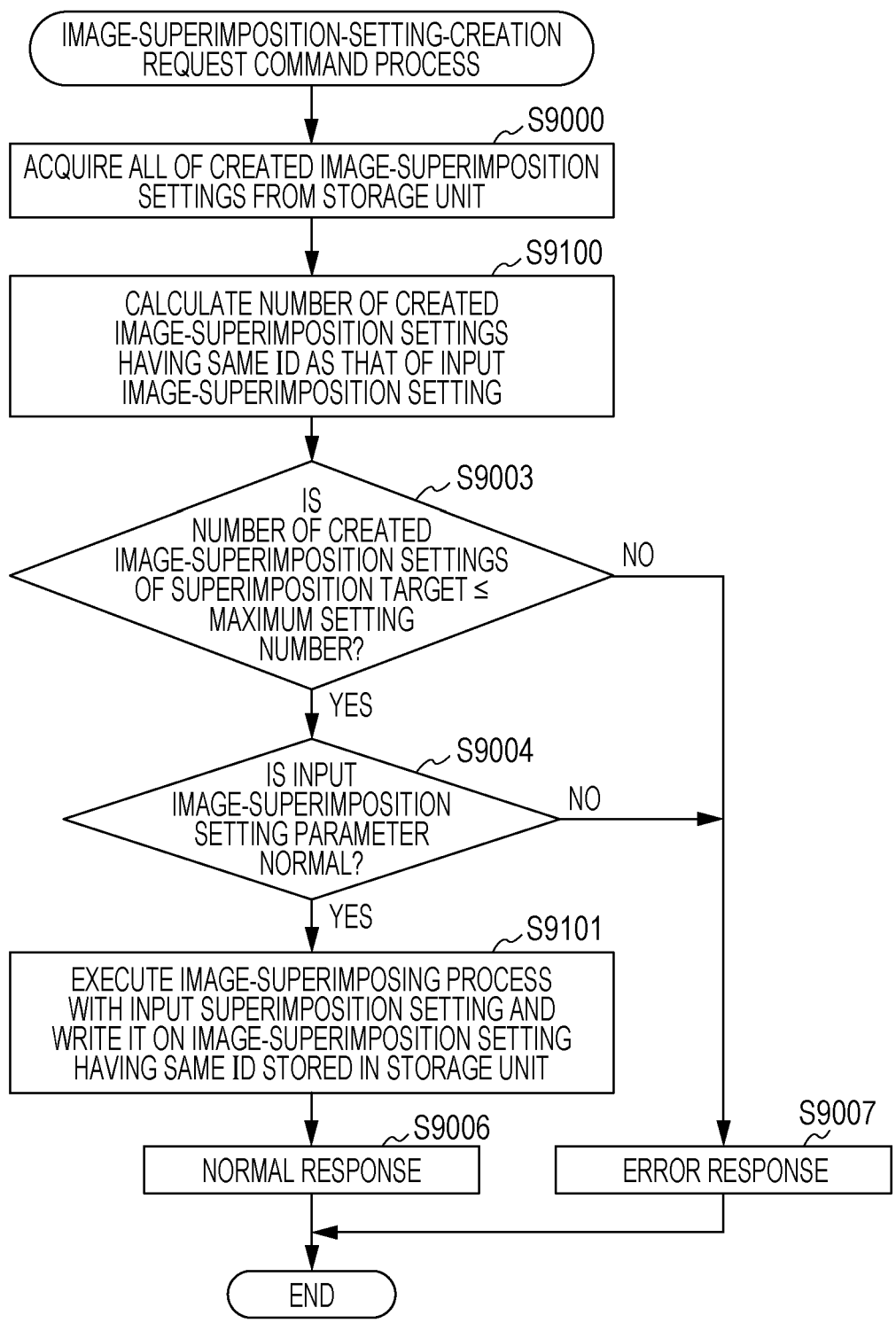
FIG. 10B is a flowchart for setting image superimposition in the monitoring camera.

FIG. 10B is a flowchart of an image-superimposition-setting-change request command process in the monitoring camera 1000. The process in FIG. 10B is executed by the control unit 1001 of the monitoring camera 1000.

The control unit 1001 of the monitoring camera 1000 executes this process when receiving an image-superimposition-setting change request command. In FIG. 10B, descriptions of steps similar to those in FIG. 10A will be omitted.

In step S9100, the control unit 1001 calculates the number of image-superimposition settings in which the same superimposition target as that included in the input image-superimposition setting input among the created image-superimposition settings acquired in step S9000.

If it is present, the control unit 1001 determines that an image superimposing process whose setting is to be changed is present and goes to step S9101. If it is not present, the control unit 1001 determines that the setting change request cannot be honored because an image superimposing process whose setting is to be changed is not present and goes to step S9007.

In step S9101, the control unit 1001 calculates the number of image-superimposition settings in which the same superimposition target as that included in the image-superimposition setting input in the image-superimposition-setting-change request command, in addition to the image-superimposition setting to be changed, among the created image-superimposition settings acquired in step S9000.

In step S9101, the control unit 1001 deletes the superimposition image in the image-superimposition setting with the same ID, displayed at the present, and executes the image superimposing process with the details of the input image-superimposition setting so that the details of the input image-superimposition setting is reflected to an image delivered by the monitoring camera 1000.

Furthermore, the control unit 1001 writes the image-superimposition setting with the same ID among the created image-superimposition settings over the input image-superimposition setting and stores it in the storage unit 1002.

Figure 10C:
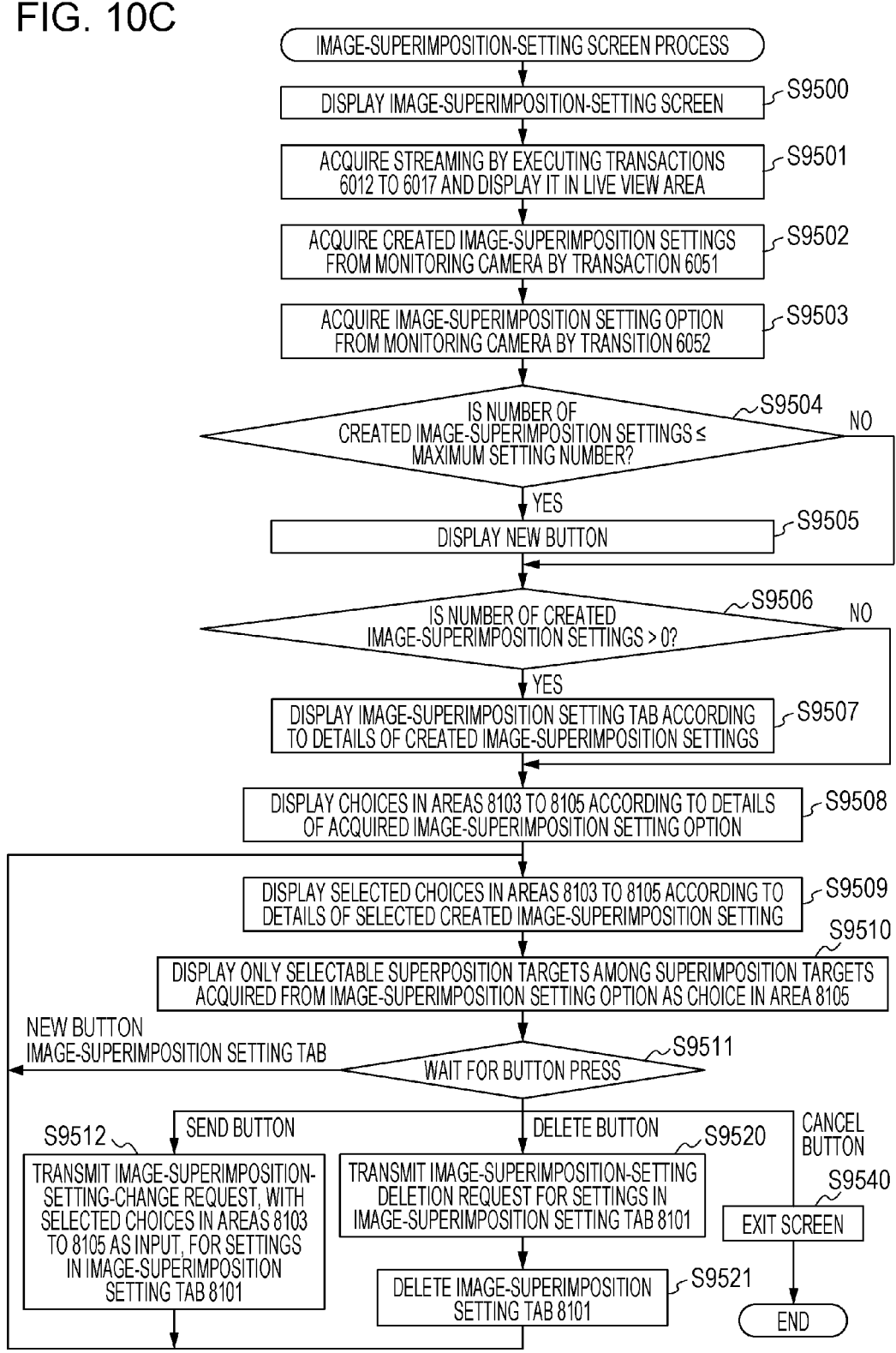
FIG. 10C is a flowchart for setting image superimposition in a client unit.

FIG. 10C is a flowchart for an image-superimposition setting screen process in the client unit 2000.

This is a process executed by the client unit 2000 when the user of the client unit 2000 wants to superimpose an image on an image delivered from the monitoring camera 1000. As a result of this process, the screen shown in FIG. 9 is displayed on the display of the client unit 2000.

In step S9500, the client unit 2000 displays an image-superimposition setting screen. In step S9501, the client unit 2000 executes the transactions 6012 to 6017 in FIG. 6A to cause the monitoring camera 1000 to transmit image streaming and displays the received image streaming in the live view area 8100.

In step S9502, the client unit 2000 executes the transaction 6051 in FIG. 6B to obtain a created image-superimposition setting list from the monitoring camera 2000.

In step S9503, the client unit 2000 executes the transaction 6052 in FIG. 6B to acquire an image-superimposition setting option from the monitoring camera 2000.

In step S9504, the client unit 2000 determines whether the number of created image-superimposition settings acquired in step S9502 is equal to or less than the maximum setting number obtained in step S9503. If the number of created image-superimposition settings is equal to or less than the maximum setting number, the client unit 2000 goes to step S9505 to display the new button 8101.

In step S9506, the client unit 2000 determines whether the number of created image-superimposition settings acquired in step S9502 is 1 or more. If the number of created image-superimposition settings is 1 or more, the client unit 2000 displays the image-superimposition setting tab 8102 in step S9507 in accordance with the detail of the created image-superimposition settings.

In step S9508, the client unit 2000 displays the choices in the areas 8103 to 8105 in FIG. 9 in accordance with the details of the image-superimposition setting option acquired in step S9503.

In step S9509, the client unit 2000 displays the choices in the areas 8103 to 8105 as selected settings in accordance with the details of the created image-superimposition setting displayed in the selected image-superimposition setting tab 8102.

In step S9510, the client unit 2000 displays only selectable targets of superimposition as choices in the area 8105, among the targets in the image-superimposition setting option acquired in step S9503. Specifically, the client unit 2000 calculates the number of created image-superimposition settings for each superimposition target for the created image-superimposition settings acquired in step S9502 and compares the number with the maximum setting number for each superimposition target acquired in step S9503. The client unit 2000 lists, as selectable choices, only superimposition targets whose number of created image-superimposition settings is equal to or less than the maximum setting number in the area 8105.

In step S9511, the client unit 2000 waits until any of the buttons on the image-superimposition setting screen is pressed. If the new button 8101 or the image-superimposition setting tab 8102 is pressed, the client unit 2000 returns to step S9509. If the send button 8106 is pressed, the client unit 2000 goes to step S9512. If the delete button 8107 is pressed, the client unit 2000 goes to step S9520. If the cancel button 8108 is pressed, the client unit 2000 goes to step S9540.

In step S9512, the client unit 2000 designates an ID corresponding to the image-superimposition setting tab 8101 that is selected at present and transmits an image-superimposition-setting-change request command with the details in the areas 8103 to 8105 as an input to the monitoring camera 1000. If not the image-superimposition setting tab but the new button 8101 is selected, the client unit 2000 transmits an image-superimposition-setting-creation request command to the monitoring camera 1000.

In step S9520, the client unit 2000 designates an ID corresponding to the selected image-superimposition setting tab 8101 and transmits an image-superimposition-setting-deletion request command to the monitoring camera 1000.

In step S9521, the client unit 2000 deletes the selected image-superimposition setting tab 8101.

In step S9540, the client unit 2000 exits the screen.

The first embodiment allows an image-capturing apparatus in which an image superimposing process is performed for each of a plurality of image clipping processes and in which image superimposition is performed at the previous stage of the compression coding process to provide the number of settable superimposition image settings and the maximum number of superimposable images to an external apparatus.

This provides an advantage in that normal image-superimposition setting for an image-capturing apparatus can be performed from an external apparatus even if the number of superimposition image settings that can be set in the image-capturing apparatus and the maximum number of superimposable images are not equal.

Second Embodiment

The first embodiment has been described when applied to a monitoring camera in which an image superimposing process is performed for each of a plurality of image clipping processes and in which image superimposition is performed at the previous stage of the compression coding process and which provides the number of settable superimposition image settings and the maximum number of superimposable images.

The present invention can also be applied to an image-capturing apparatus in which image superimposition is performed for each of a plurality of compression coding processes in the image-capturing apparatus and in which the image superimposition is performed in the previous stage of a resizing process. A second embodiment of the present invention will be described hereinbelow with reference to FIGS. 1 to 9. Descriptions of parts similar to those of the first embodiment will be omitted.

FIG. 1 is a configuration diagram of a monitoring camera system according to an embodiment of the present invention.

In FIG. 1, reference sign 1000 denotes a monitoring camera according to an embodiment of the present invention.

FIG. 2 is a diagram showing the internal configuration of the monitoring camera 1000.

FIG. 3 illustrates the structure of parameters that the monitoring camera 1000 holds.

Figure 11:
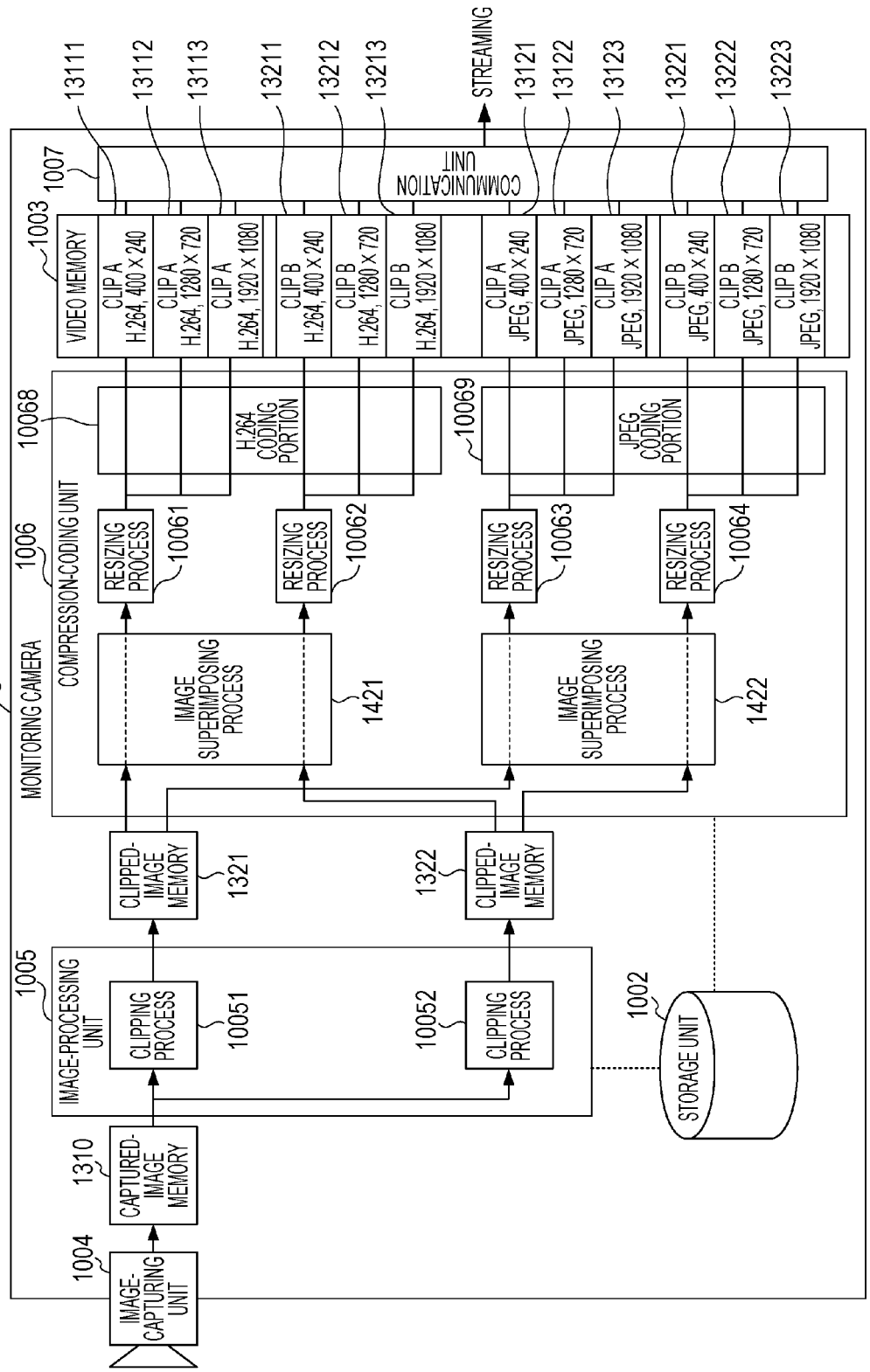
FIG. 11 is a diagram showing the relationship between the processing blocks and memories of the monitoring camera according to a second embodiment.

FIG. 11 shows the relationship between processing blocks and memories in the monitoring camera 1000 according to the second embodiment.

The image-processing unit 1005 does not perform an image superimposing process in contrast to the first embodiment.

The compression-coding unit 1006 resizes images in the clipped-image memories 1321 and 1322 by the resizing processes 10061 to 10064 into three sizes in total, which can be designated by the compression-coding settings 6120 and 6121. If an image-superimposition setting is set for individual compression coding types, both of clipped images in the clipped-image memories 1321 and 1322 are resized after being subjected to an image superimposing process in accordance with the details of the image-superimposition settings. If an image-superimposition setting for H.264 is present, the images in the clipped-image memory 1321 are processed in an image superimposing process 1421, and if an image-superimposition setting for JPEG is present, the images in the clipped-image memory 1322 are processed in an image superimposing process 1422.

Furthermore, the resized images are compressed and coded in the H.264 coding portion 10068 or the JPEG coding portion 10069 and are output to the delivery-image memories 13111 to 13223 as delivery images.

Reference sign 1900 in FIG. 5A denotes example image data that the image-capturing unit 1004 having the parameters shown in the image-capturing-unit setting 6102 stored in the storage unit 1002 outputs to the captured-image memory 1310.

FIG. 5B illustrates an example image delivered to the client unit 2000 on the basis of the delivery profile 6100. This is an image clipped in accordance with the image processing setting 6110 and compressed and coded in the H.264 format into a size of 1,280×720 in accordance with the compression-coding setting 6120 and is stored in the delivery-image memory 13112.

In FIG. 5B, reference signs 1920 and 1921 denote superimposition images superimposed on the delivery image 1901 on the basis of the image-superimposition settings 6150 and 6151, respectively. Examples of the details of the image-superimposition settings 6150 and 6151 are shown in FIG. 13. Since the superimposition target in both settings 6150 and 6151 is compression-coding type=H.264, superimposition images 1920 and 1921 are superimposed on the delivery image 1901 in FIG. 5B that is compressed and coded by the compression-coding unit 10068.

In FIG. 5C, reference sign 1922 denotes a superimposition image superimposed on the delivery image 1902 on the basis of the image-superimposition setting 6152. An example of the details of the image-superimposition setting 6152 is shown in FIG. 13. Since the superimposition target is image processing setting ID=B, that is, the image processing setting 6111 is designated, the superimposition image 1922 is superimposed on the delivery image 1902 in FIG. 5C compressed and coded by the compression-coding unit 10069.

FIG. 6A shows a typical command sequence from the start of setting to delivery of an image between the monitoring camera 1000 and the client unit 2000.

FIG. 6B shows a typical command sequence of an image superimposing process between the monitoring camera 1000 and the client unit 2000.

FIG. 12 shows an example of the details of an image-superimposition setting option that the monitoring camera 1000 returns to the client unit 2000 in the transaction 6052.

FIG. 12 shows that the monitoring camera 1000 supports a maximum of six image-superimposition settings and that compression coding types H.264 and JPEG can be designated as the superimposition target, to each of which a maximum of three image-superimposition settings can be applied. In other words, if the seventh image-superimposition setting is to be created irrespective of the superimposition target, the monitoring camera 1000 returns an error response indicating that the setting cannot be created. If the fourth image-superimposition setting for the H.264 format is designated by the client unit 2000, the monitoring camera 1000 returns an error response indicating that the designation is impossible even if the sum of image-superimposition settings is six or less.

Figure 14:
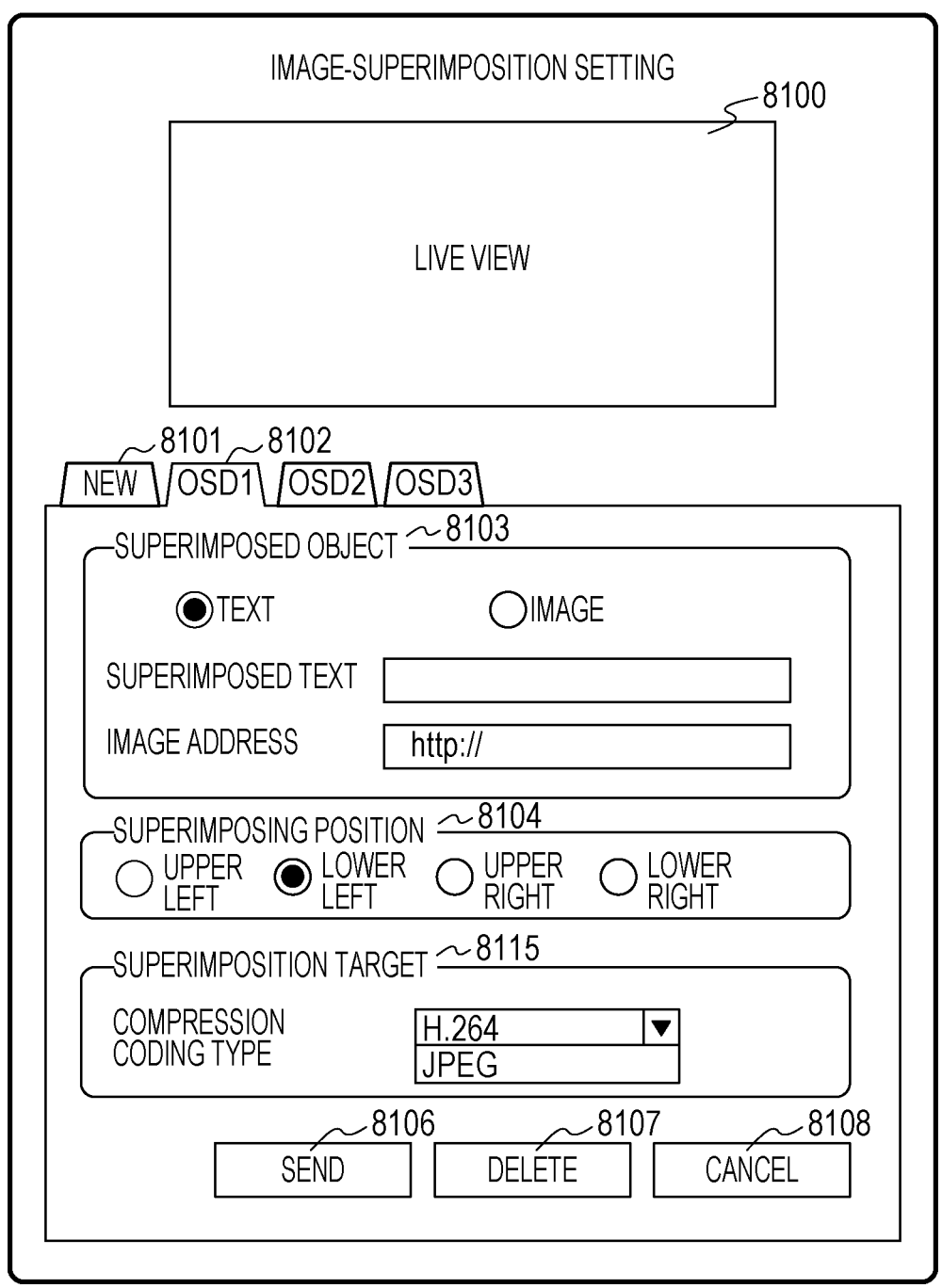
FIG. 14 is a diagram showing an example of an image-superimposition setting screen for setting image superimposition according to the second embodiment.

FIG. 14 shows an example of an image-superimposition setting screen of the client unit 2000 for setting image superimposition of the monitoring camera 1000.

Reference sign 8115 denotes a superimposed-object specification area. The client unit 2000 provides choices of a superimposition target depending on the details of a superimposed-image parameter in the image-superimposition setting option obtained by the transaction 6052. In FIG. 14, the superimposition target and the compression coding types, H.264 and JPEG illustrated in FIG. 12, are provided as choices.

The flowcharts in FIGS. 10A, 10B, and 10C show workflows for image-superimposition setting in the monitoring camera 1000 and the client unit 2000.

The second embodiment allows an image-capturing apparatus in which an image superimposing process is performed for each of a plurality of different types of compression coding process and in which image superimposition is performed at the previous stage of the resizing process to provide the number of settable superimposition image settings and the maximum number of superimposable images to an external apparatus.

This provides an advantage in that normal image-superimposition setting for an image-capturing apparatus can be performed from an external apparatus even if the number of superimposition image settings that can be set in the image-capturing apparatus and the maximum number of superimposable images are not equal.

Third Embodiment

The second embodiment has been described when applied to a monitoring camera in which an image superimposing process is performed for each of a plurality of compression coding processes and in which image superimposition is performed at the previous stage of the resizing process and which provides the number of settable superimposition image settings and the maximum number of superimposable images.

The present invention can also be applied to an image-capturing apparatus in which image superimposition is performed in the subsequent stage of the clipping process and the resizing process for each of compression coding types. A third embodiment of the present invention will be described hereinbelow with reference to FIGS. 1 to 9. Descriptions of parts similar to those of the first embodiment will be omitted.

FIG. 1 is a configuration diagram of a monitoring camera system according to an embodiment of the present invention. In FIG. 1, reference sign 1000 denotes a monitoring camera according to an embodiment of the present invention.

FIG. 2 is a diagram showing the internal configuration of the monitoring camera 1000.

FIG. 3 illustrates the structure of parameters that the monitoring camera 1000 holds.

Figure 15:
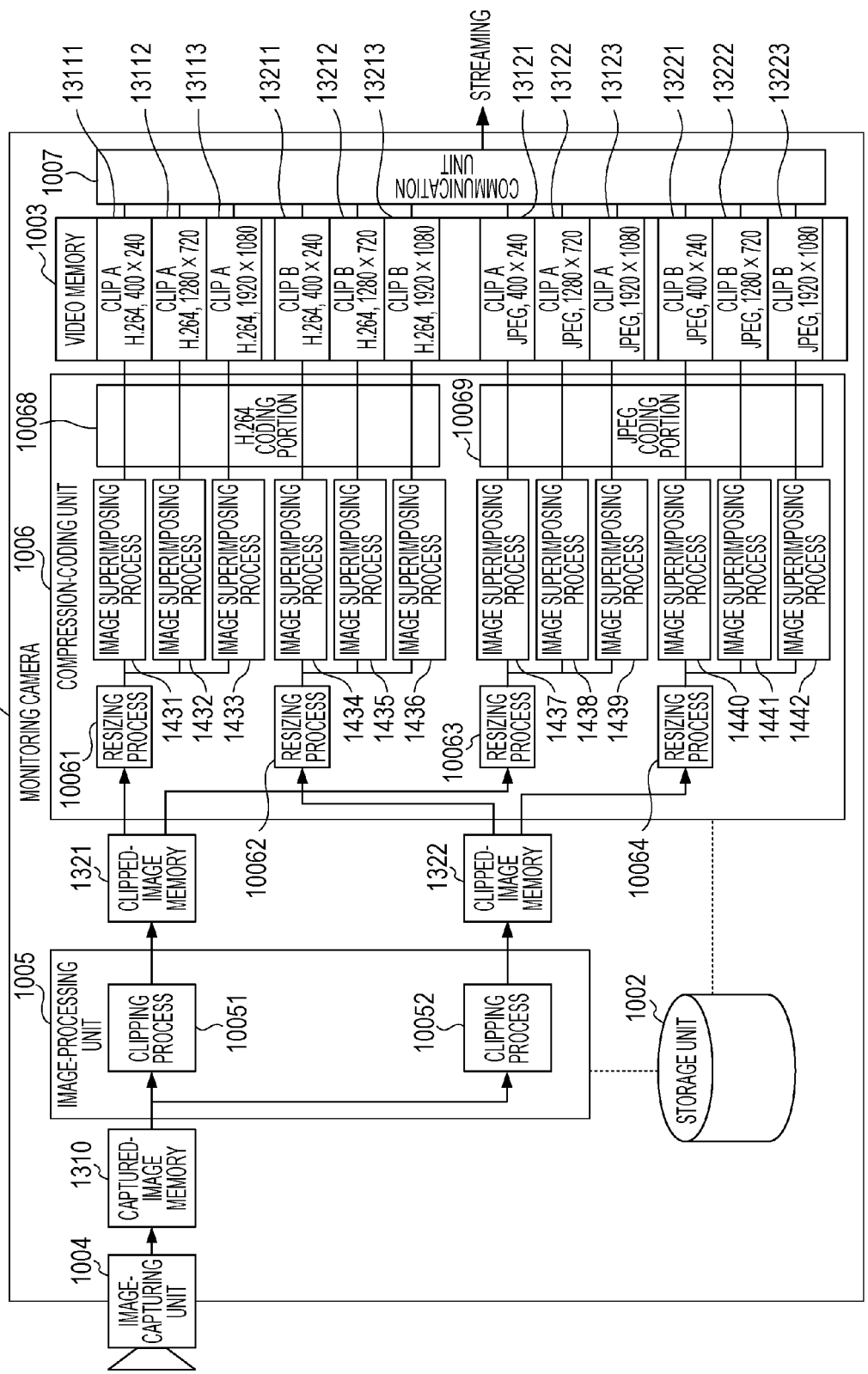
FIG. 15 is a diagram showing the relationship between the processing blocks and memories of the monitoring camera according to a third embodiment.

FIG. 15 is a diagram showing the relationship between the processing blocks and memories of the monitoring camera 1000.

In contrast to the first embodiment, the image-processing unit 1005 does not perform an image superimposing process.

The compression-coding unit 1006 resizes images in the clipped-image memories 1321 and 1322 by the resizing processes 10061 to 10064 into three sizes in total, which can be designated by the compression-coding settings 6120 and 6121. If an image-superimposition setting is set, image superimposing processes 1431 to 1442 are performed in accordance with the details of a combination of an image processing setting, compression coding type, and the compression coding resolution of the superimposition target. Furthermore, the individual resized images are coded and compressed by the H.264 coding portion 10068 and the JPEG coding portion 10069 and are output to the delivery-image memories 13111 to 13223 as delivery images.

Reference sign 1900 in FIG. 5A denotes example image data that the image-capturing unit 1004 having the parameters shown in the image-capturing-unit setting 6102 stored in the storage unit 1002 outputs to the captured-image memory 1310.

FIG. 5B illustrates an example image delivered to the client unit 2000 on the basis of the delivery profile 6100. This is an image clipped in accordance with the image processing setting 6110 and compressed and coded in the H.264 format into a size of 1,280×720 in accordance with the compression-coding setting 6120 and is stored in the delivery-image memory 13112.

In FIG. 5B, reference signs 1920 and 1921 denote superimposition images superimposed on the delivery image 1901 on the basis of the image-superimposition settings 6150 and 6151, respectively. Examples of the details of the image-superimposition settings 6150 and 6151 are shown in FIG. 17. Since the superimposition target in both settings 6150 and 6151 is set to image processing setting A, compression-coding type=H.264, and compression coding resolution=1,280×720, the superimposition images 1920 and 1921 are superimposed on the delivery image 1901 in FIG. 5B that satisfies these three conditions.

In FIG. 5C, reference sign 1922 denotes a superimposition image superimposed on the delivery image 1902 on the basis of the image-superimposition setting 6152. An example of the details of the image-superimposition setting 6152 is shown in FIG. 17. Since the superimposition target is set to image processing setting ID=B, compression-coding type=JPEG, and compression coding resolution=400×240, the superimposition image 1922 is superimposed on the delivery image 1902 in FIG. 5C that satisfies the these three conditions.

FIG. 6A shows a typical command sequence from the start of setting to delivery of an image between the monitoring camera 1000 and the client unit 2000.

FIG. 6B shows a typical command sequence of an image superimposing process between the monitoring camera 1000 and the client unit 2000.

FIG. 16 shows an example of the details of an image-superimposition setting option that the monitoring camera 1000 returns to the client unit 2000 in the transaction 6052.

FIG. 16 shows that the monitoring camera 1000 supports a maximum of six image-superimposition settings and that a combination of three kinds of parameter, that is, image processing setting, compression coding type, and compression coding resolution, can be designated as the superimposition target.

FIG. 16 shows not all combinations. A maximum of three image-superimposition settings can be applied to each of combinations. In other words, if the seventh image-superimposition setting is to be created irrespective of the superimposition target, the monitoring camera 1000 returns an error response indicating that the setting cannot be created.

If four image-superimposition settings in which a combination of the image processing setting, compression coding type, and compression coding resolution is the same is designated by the client unit 2000, the monitoring camera 1000 returns an error response that the designation is impossible even if the sum of image-superimposition settings is six or less.

Figure 18:
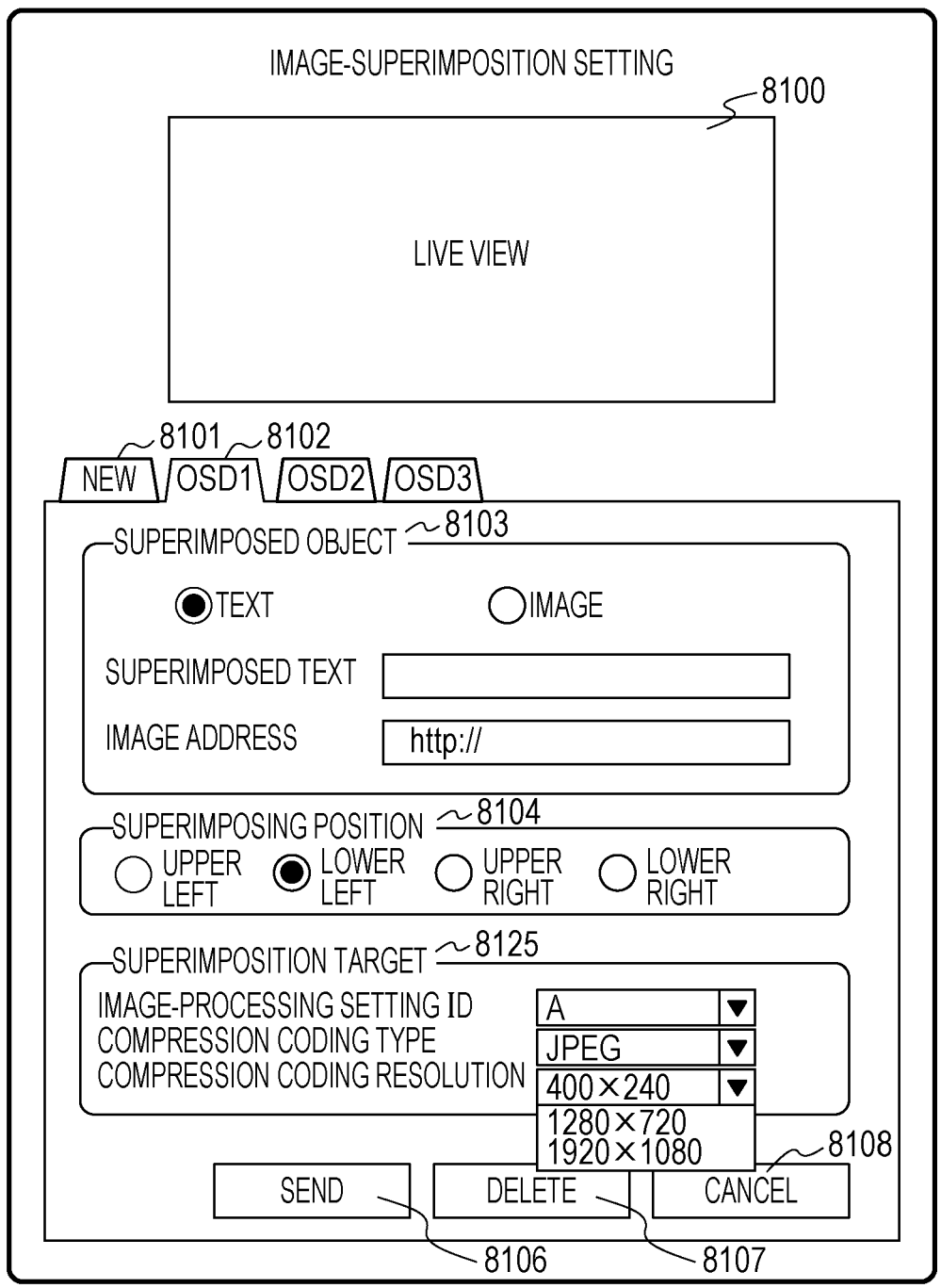
FIG. 18 is a diagram showing an example of an image-superimposition setting screen for setting image superimposition according to the third embodiment.

FIG. 18 shows an example of an image-superimposition setting screen of the client unit 2000 for setting image superimposition of the monitoring camera 1000.

Reference sign 8125 denotes a superimposed-object specification area. The client unit 2000 provides choices of a superimposed image depending on the details of superimposed-image parameters in the image-superimposition setting option obtained by the transaction 6052. In FIG. 18, the three parameters of the superimposition target shown in FIG. 16, that is, image processing setting, compression coding type, and compression coding resolution, are provided as choices.

The flowcharts in FIGS. 10A, 10B, and 10C show workflows for image-superimposition setting in the monitoring camera 1000 and the client unit 2000.

The third embodiment allows an image-capturing apparatus in which image superimposition is performed at the subsequent stage of the clipping process and the resizing process for each of compression coding type to provide the number of superimposition image settings and the maximum number of images that can be subjected to superimposition at one time to an external apparatus.

This provides an advantage in that normal image-superimposition setting for an image-capturing apparatus can be performed from an external apparatus even if the number of superimposition image settings that can be set in the image-capturing apparatus and the maximum number of superimposable images are not equal.

Although the operations of the monitoring camera 1000 and the client unit 2000 implementing the present invention have been described in the first to third embodiments, the present invention is not limited to the above; the embodiments may be partly changed.

Although FIG. 16 shows combinations of image processing setting, compression coding type, and compression coding resolution as choices for the superimposition target, the IDs of compression-coding settings in 6120 and 6121 may be provided as choices instead of the compression coding type and compression coding resolution.

In this case, acquiring the compression coding type and compression coding resolution in the image superimposing process on the basis of the ID of the compression-coding setting offers the same advantages as those in the third embodiment.

Although the image-superimposition setting in FIG. 8 includes the superimposition target, superimposed object, superimposing position, superimposed text, and a superimposition image, the present invention is not limited thereto. For example, including the font size of superimposed text, the size of a superimposition image, and so on does not limit the spirit and scope of the present invention.

In FIG. 7A, only four corners of the image are provided as choices of the image superimposing position, the present invention is not limited thereto. A method of designating an any position in the image with its coordinates and a method of specifying the position of a feature portion in the image, such as a human face and a number plate, by image processing and superimposing an image on the position do not limit the spirit and scope of the present invention.

Although the above embodiments have been described with reference to a so-called on-screen display function in which a specific character string or image is superimposed on a delivery image, the present invention is not limited thereto. It is needless to say that the present invention can also be applied to a so-called masking function for superimposing or processing images so that a specific position of a delivery image cannot be viewed by a receiving side.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-115686, filed May 31, 2013, which is hereby incorporated by reference herein in its entirety.

The invention claimed is:

1. An image-capturing apparatus comprising:
    a capturing unit comprising circuitry configured to capture an image;
    a superimposition unit configured to superimpose an object into target images captured by the capturing unit;
    a reception unit configured to receive a request to acquire information regarding a number of settable objects; and
    a transmission unit configured to transmit at least one of maximum numbers of settable objects which are to be superimposed into target images based on the request received by the reception unit, wherein the maximum numbers of settable objects correspond to respective types of the target images,
    wherein the superimposition unit, the reception unit, and the transmission unit are each implemented by at least one processor.

2. The image-capturing apparatus according to claim 1, further comprising:
    an acquisition unit configured to acquire a number of objects to be superimposed into a target image;
    a comparison unit configured to compare the number of object acquired by the acquisition unit and one of the maximum numbers of settable objects; and
    a determination unit configured to determine that an error has occurred when the comparison by the comparison unit shows that the number acquired by the acquisition unit is greater than the one of the maximum numbers of settable objects.

3. The image-capturing apparatus according to claim 1, wherein the object includes text.

4. The image-capturing apparatus according to claim 1, wherein the object includes an image.

5. The image-capturing apparatus according to claim 1, wherein the types of the target images include at least one of coding type, image process setting, and image size.

6. An image capturing apparatus comprising:
    a first acquisition unit configured to acquire a number of objects to be superimposed into a target image captured by the image-capturing apparatus;
    a second acquisition unit configured to acquire at least one of maximum numbers of settable objects for target images, wherein the maximum numbers of settable objects correspond to respective types of the target images; and
    a display configured to display a screen for setting superimposition in accordance with a result of comparison between the number acquired by the first acquisition unit and the one of the maximum numbers acquired by the second acquisition unit,
    wherein the first acquisition unit and the second acquisition unit are each implemented by at least one of the at least one processor.

7. The image-capturing apparatus according to claim 6, wherein the types of the target images include at least one of coding type, image process setting, and image size.

8. A method for controlling an image-capturing apparatus that can superimpose an object into captured target images, the method comprising:
    receiving a request to acquire information regarding a number of settable objects; and
    transmitting at least one of maximum numbers of settable objects which are to be superimposed into target images based on the received request, wherein the maximum numbers of settable objects correspond to respective types of the target images.

9. The method according to claim 8, wherein the types of the target images include at least one of coding type, image process setting, and image size.

10. A method for controlling an image-capturing apparatus, the method comprising:
acquiring, as a first acquisition, a number of objects to be superimposed into a target image captured by the image-capturing apparatus;
acquiring, as a second acquisition, at least one of maximum numbers of settable objects for target images, wherein the maximum numbers of settable objects correspond to respective types of the target images; and
displaying a screen for setting superimposition in accordance with a result of comparison between the number acquired by the first acquisition and the one of the maximum numbers acquired by the second acquisition.

11. An imaging system comprising:
an external apparatus; and
an image-capturing apparatus to communicate with the external apparatus via a network, wherein the image-capturing apparatus includes:
an image-capturing unit comprising circuitry configured to capture an image of a subject, and
a superimposition unit implemented by at least one of a first at least one processor and configured to superimpose objects into a captured image output from the image-capturing unit, and
wherein the external apparatus includes:
a reception unit implemented by at least one of a second at least one processor and configured to receive at least one of maximum numbers of settable objects which are to be superimposed into captured images from the image-capturing apparatus via the network, wherein the maximum numbers of settable objects correspond to respective types of the captured images.

12. The imaging system according to claim 11, wherein the external apparatus further includes a user interface configured to allow a user to set objects based on one of the maximum numbers of settable objects for respective captured images received by the reception unit.

13. The imaging system according to claim 12, wherein the number of objects set via the user interface does not exceed the one of the maximum numbers of settable objects received by the reception unit.

14. The imaging system according to claim 11, wherein the object includes text.

15. The imaging system according to claim 11, wherein the object includes an image.

16. The imaging system according to claim 11, wherein the reception unit receives a number of objects which are to be superimposed into captured images.

17. A method for controlling an imaging system including an external apparatus and an image-capturing apparatus to communicate with the external apparatus via a network, the method comprising:
capturing an image of a subject via the image-capturing apparatus;
superimposing, via the image-capturing apparatus, objects into an output captured image; and
receiving, via the external apparatus, at least one of maximum numbers of settable objects which are to be superimposed into captured images from the image-capturing apparatus via the network, wherein the maximum numbers of settable objects correspond to respective types of the captured images.

* * * * *